United States Patent [19]

Nakano et al.

[11] Patent Number: 5,392,134

[45] Date of Patent: Feb. 21, 1995

[54] FACSIMILE APPARATUS WITH MOUNT FOR RECEIVING DATA MEMORY CARD

[75] Inventors: Yuji Nakano, Kawasaki; Shingo Isozaki, Yokohama; Yuji Kurosawa, Kawasaki, all of Japan

[73] Assignee: Canon Kabushiki Kaisha, Tokyo, Japan

[21] Appl. No.: 994,461

[22] Filed: Dec. 21, 1992

Related U.S. Application Data

[63] Continuation of Ser. No. 538,843, Jun. 15, 1990, abandoned.

[30] Foreign Application Priority Data

| Jun. 16, 1989 | [JP] | Japan | 1-154163 |
| Jun. 20, 1989 | [JP] | Japan | 1-155599 |
| Jun. 20, 1989 | [JP] | Japan | 1-155600 |
| Jun. 20, 1989 | [JP] | Japan | 1-155601 |
| Jun. 21, 1989 | [JP] | Japan | 1-156749 |
| Jun. 26, 1989 | [JP] | Japan | 1-160620 |
| Jun. 28, 1989 | [JP] | Japan | 1-163656 |

[51] Int. Cl.⁶ ............................................. G06F 13/00
[52] U.S. Cl. ...................................... 358/442; 358/444; 358/468
[58] Field of Search ............. 341/22; 340/825.29, 340/825.31, 825.34; 358/442, 444, 468; 902/4, 5, 20, 24, 25, 26, 30, 17; 379/96, 100, 102, 143, 144; 235/380, 381, 382, 376, 441, 482, 483, 485, 486, 490, 491, 492, 495; 439/325, 326, 329

[56] References Cited

U.S. PATENT DOCUMENTS

| 3,821,518 | 6/1974 | Miller | 235/485 |
| 4,523,087 | 6/1985 | Benton | 902/26 |
| 4,625,276 | 11/1986 | Benton et al. | 379/144 |
| 4,634,895 | 1/1987 | Hale et al. | 902/26 |
| 4,678,252 | 7/1987 | Moore | 439/326 |
| 4,795,891 | 1/1989 | Morigaki | 235/380 |
| 4,838,809 | 6/1989 | Banjo et al. | 439/325 |
| 4,870,604 | 9/1989 | Tatsuno | 235/380 |
| 4,901,068 | 2/1990 | Benton et al. | 340/825.31 |
| 4,918,723 | 4/1990 | Iggulden et al. | 379/100 |
| 4,926,325 | 5/1990 | Benton et al. | 340/825.29 |
| 4,956,721 | 9/1990 | Tasaki et al. | 379/100 |
| 5,057,032 | 10/1991 | Kaufman et al. | 439/326 |

FOREIGN PATENT DOCUMENTS

| 3533740 | 3/1987 | Germany | 379/143 |
| 56-140457 | 11/1981 | Japan | . |
| 86955 | 5/1985 | Japan | 379/96 |
| 263848 | 10/1988 | Japan | 902/4 |
| 2198595 | 6/1988 | United Kingdom | 439/325 |

*Primary Examiner*—Michael Horabik
*Attorney, Agent, or Firm*—Fitzpatrick, Cella, Harper & Scinto

[57] ABSTRACT

A facsimile apparatus includes a mounting portion for detachably receiving a data memorandum card having data input keys. The mounting portion has an opening for allow key operations of the card mounted in the mounting portion. The mounting portion causes a positioning mechanism to accurately position the card mounted in the mounting portion, thereby allowing accurate signal exchange between the data memorandum card and a facsimile apparatus main body.

2 Claims, 19 Drawing Sheets

FACSIMILE APPARATUS WITH MOUNT FOR RECEIVING DATA MEMORY CARD

This application is a continuation of application Ser. No. 07/538,843, filed Jun. 15, 1990, now abandoned.

FIELD OF THE INVENTION

The present invention relates to a facsimile apparatus for detachably receiving a data memory card such as an electronic telephone directory.

BACKGROUND OF THE INVENTION

In recent years, facsimile apparatuses with advanced functions, and multi-functional facsimile apparatuses have been available. Along with the development of multi-functional facsimile apparatuses with advanced functions, various functions have been realized. For example, destinations can be registered as abbreviated dial numbers. For this reason, the number of input switches on an operation panel has increased and the size of each switch has been reduced, thereby degrading operability.

A system for assigning a plurality of functions to each operation input switch to switch the input function is employed, as proposed in the U.S. Pat. No. 5,075,686 or in FIG. 1 of Japanese Patent Laid-Open No. 56-140457.

Along with the development of priorly known multi-functional facsimile apparatus, an IC ROM card has been detachably mounted in the facsimile apparatus to enhance the functions of the facsimile apparatus. An end of the ROM card is connected to a connector in the facsimile apparatus to enhance the storage function and the like of the facsimile apparatus.

However, when one facsimile apparatus is shared by a plurality of users, the individual users often perform facsimile transmission to different destinations. In this conventional system, since the number of abbreviated dial numbers registered in the facsimile apparatus or its storage capacity is limited, it is impractical for different users to register the names of their companies or the like in a memory of the facsimile apparatus.

SUMMARY OF THE INVENTION

It is an object of the present invention to solve the conventional problems described above and to allow external control of a data memory card mounted in a mounting portion which detachably receives the data memory card such as an electronic telephone directory having data input keys.

It is another object of the present invention to assure positioning of the data memory card in the mounting portion of a facsimile apparatus.

It is still another object of the present invention to assure light shielding when the data memory card is not set in the mounting portion.

It is still another object of the present invention to improve detection precision of a card sensor for detecting whether the data memory card is mounted in the mounting portion.

The above and other objects, features, and advantages of the present invention will be apparent from the detailed description of preferred embodiments in conjunction of the accompanying drawings.

DESCRIPTION OF THE PREFERRED EMBODIMENTS

Figure 1:
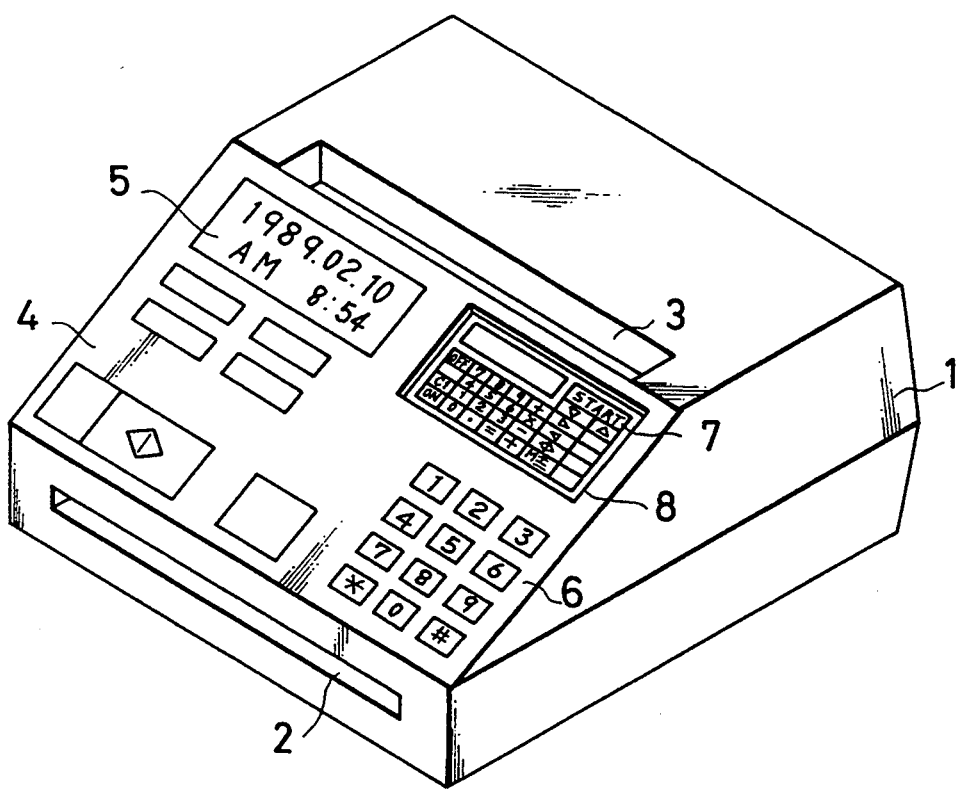
FIG. 1 is a perspective view showing the outer appearance of a facsimile apparatus according to the first embodiment of the present invention.
Figure 2:
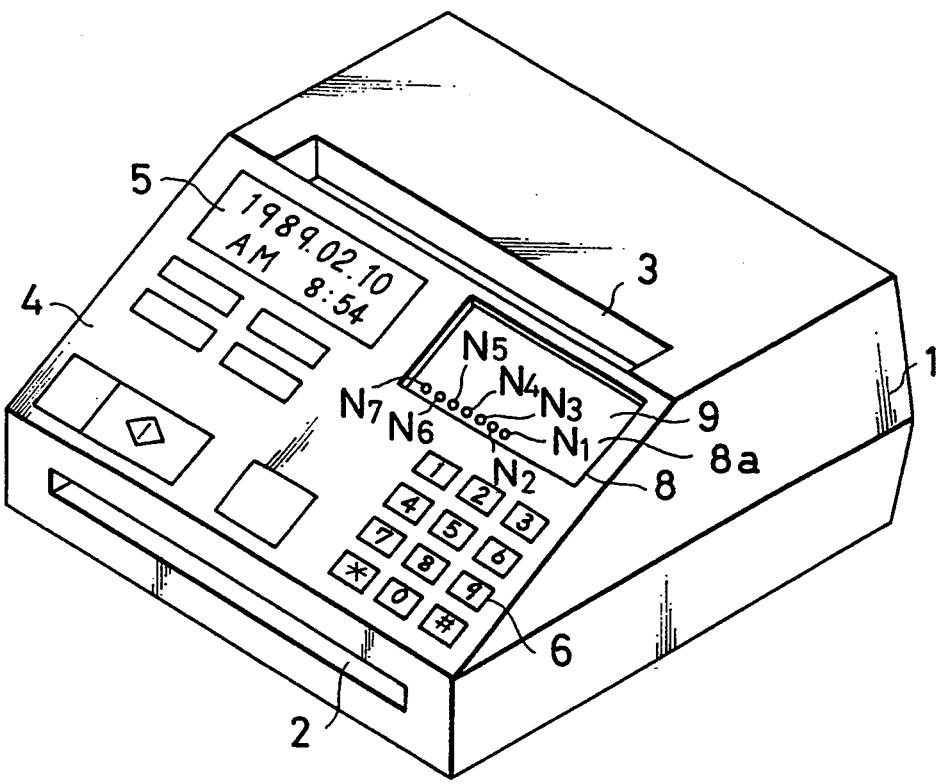
FIG. 2 is a perspective view showing a state wherein a card is removed from the facsimile apparatus shown in FIG. 1.

The first embodiment of the present invention will be described with reference to the accompanying drawings. FIGS. 1 and 2 show the outer appearance of a data input/output apparatus such as a facsimile apparatus with an electronic telephone directory. This data input/output apparatus comprises a main body 1, an original insertion slot 2 formed in the front surface of the main body 1, and a port 3 for discharging the original and a recording sheet. The port 3 is formed in the upper surface of the main body 1. An operation unit 4 is formed as a surface inclined from the upper surface of the main body 1. The operation unit 4 has a display unit 5, a ten-key pad 6, and other various keys. The operation unit 4 also has a mounting portion 8 in which a data memorandum card 7 is detachably mounted,. The mounting portion 8 has an opening 8a for detachably mounting the data memorandum card 7 to allow external operations of keys on the card 7. A placing portion 9 for placing the card 7 in the mounting portion 8 is formed integrally with the operation panel 4. Light-receiving elements $N_1$ to $N_7$ are arranged in the placement portion 9.

Figure 3:
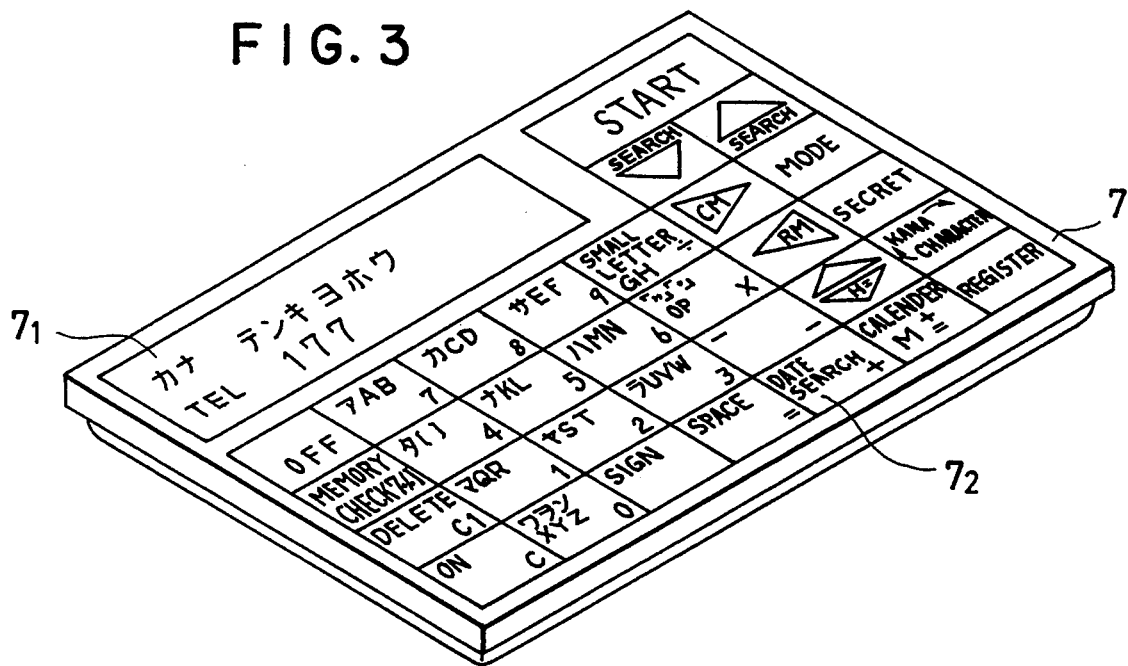
FIG. 3 is a perspective view of a data memorandum card used in the facsimile apparatus shown in FIG. 1 when the card is viewed from its upper surface.
Figure 4:
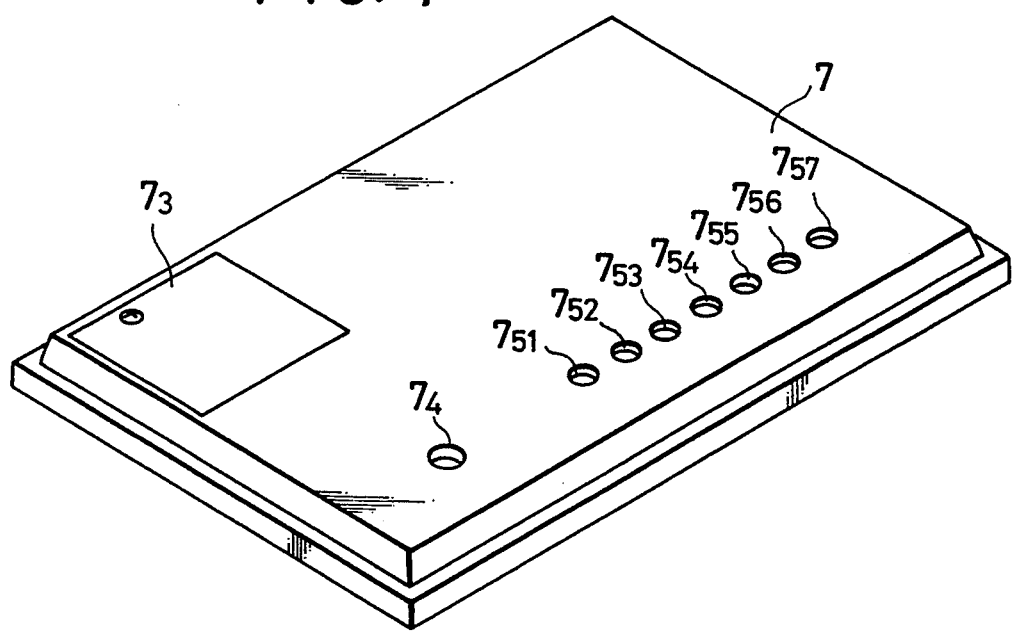
FIG. 4 is a perspective view of the data memorandum card when it is viewed from its lower surface.
Figure 5:
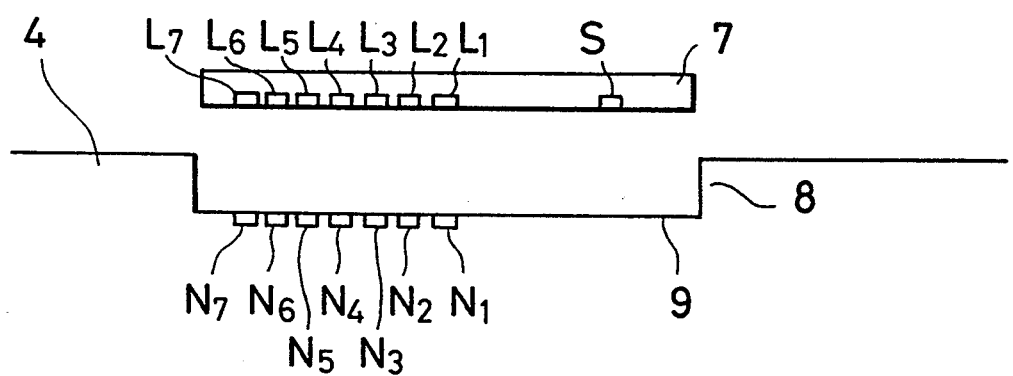
FIG. 5 is a view showing a mounting portion in FIG. 1 to explain a relationship between a light-receiving unit in FIG. 2 and a light-emitting unit in FIG. 4.

A display unit $7_1$ and various data keys $7_2$ are arranged on the surface of the data memorandum card 7, as shown in FIG. 3. The data keys $7_2$ allow functioning of the data content of the card 7 as a telephone directory. The display unit $7_1$ is used to display the data content as a result of an operation with the data keys $7_2$. A battery cover $7_3$ is mounted on the lower surface of the card 7, and a reset switch window $7_4$ and seven LED windows $7_{51}$ to $7_{57}$ are formed in the lower surface of the card 7, as shown in FIG. 4. The battery cover $7_3$ is fixed to the card 7 by a screw, and a lithium battery is stored under the battery cover $7_3$. When a pin is inserted into the reset switch window $7_4$ and depresses a reset switch S in the card 7, the reset switch S shown in FIG. 5 is operated to clear various data stored in the card 7. The LED windows $7_{51}$ to $7_{57}$ respectively transmit light emitted from seven light-emitting diodes $L_1$, $L_2$, $L_3$, $L_4$, $L_5$, $L_6$, and $L_7$ arranged inside the card 7 as shown in FIG 5. The light-emitting diodes $L_1$ to $L_7$ oppose seven light-receiving elements $N_1$, $N_2$, $N_3$, $N_4$, $N_5$, $N_6$, and $N_7$ as shown in FIG. 5 so that data represented by a key input operation on the card 7 can be input to the facsimile apparatus.

An operation of the above arrangement will be described below.

The card 7 is held while the LED windows $7_{51}$ to $7_{57}$ on the lower surface of the card 7 are aligned with the light-receiving elements $N_1$ to $N_7$ on the apparatus side and is positioned in the recessed mounting portion 8.

The card 7 is positioned by the surrounding wall surfaces of the mounting portion 8 and can be appropriately located in position, and offsets between the light-emitting diodes $L_1$ to $L_7$ and the light-receiving elements $N_1$ to $N_7$ are eliminated. Therefore, a correct positional relationship can be obtained to perform correct communication.

The keys $7_2$ of the card 7 are visually observed by an operator through the opening $8a$, and the operator depresses a desired key $7_2$ of the card 7. Information corresponding to the depressed key $7_2$ of the card 7 is transmitted as light information from the light-emitting diodes $L_1$ to $L_7$ to the light-receiving elements $N_1$ to $N_7$ on the facsimile apparatus.

Figure 6:
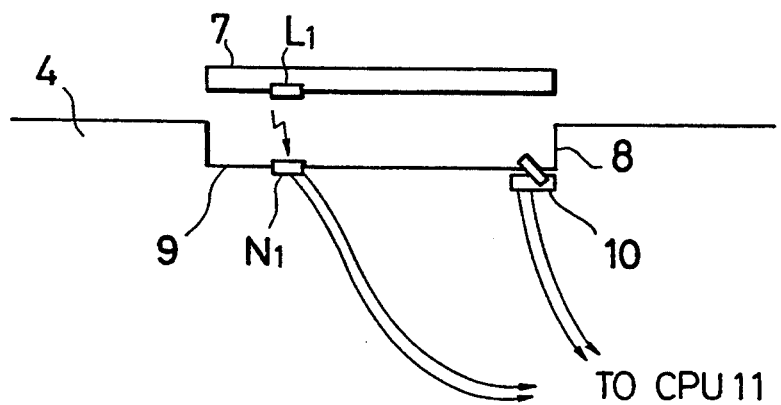
FIG. 6 is a view showing an arrangement having a card sensor mounted in the mounting portion shown in FIG. 1 according to the second embodiment of the present invention.

FIG. 6 shows the second embodiment of the present invention in which a switch 10 for detecting the presence/absence of the card in the mounting portion in FIG. 1, and other arrangements are the same as those in the first embodiment.

Figure 7:
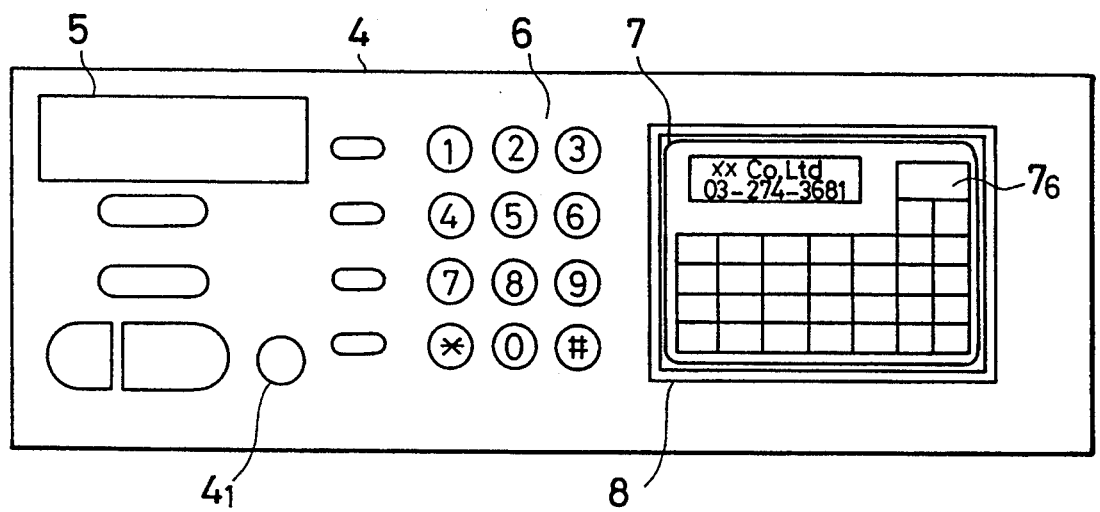
FIG. 7 is a plan view showing an operation unit in the facsimile apparatus having the mounting portion shown in FIG. 6.

The operation unit in FIG. 7 has the layout in which the respective components in FIG. 1 are aligned in line and is substantially the same as that of the first embodiment. The same reference numerals as in the first embodiment denote the same parts in the second embodiment, and a detailed description thereof will be omitted.

Figure 8:
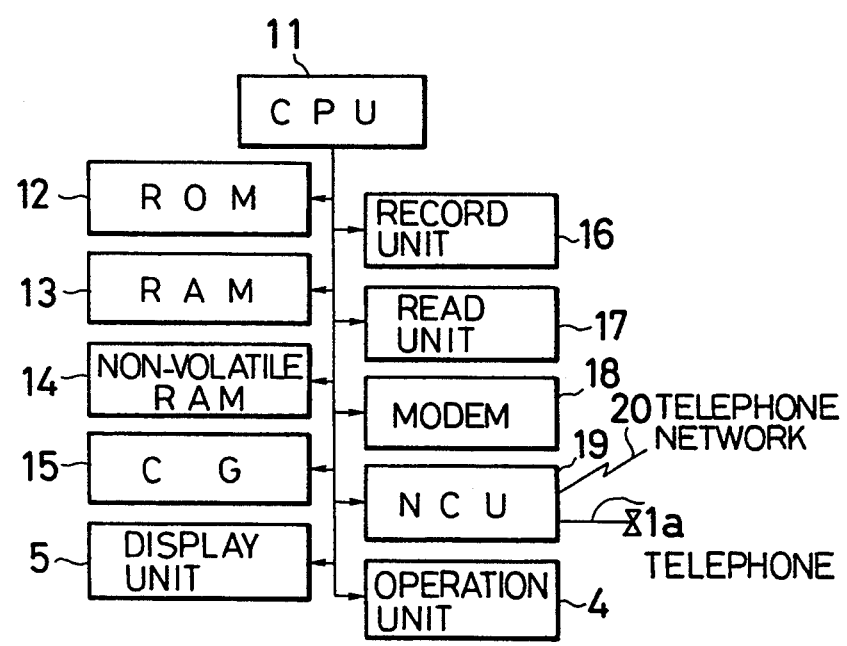
FIG. 8 is a block diagram showing the apparatus shown in FIG. 7.

A CPU 11 in FIG. 8 is a central processing unit which controls the facsimile apparatus as a whole in accordance with programs stored in a ROM (Read-Only Memory) 12, i.e., a RAM (Random Access Memory) 13, a non-volatile RAM 14, a character generator (CG) 15, a record unit 16, a read unit 17, a modem 18, a network control unit (NCU) 19, the operation unit 4, the display unit 5, and a selection signal output unit.

The RAM 13 stores binary image data read by the read unit 17 and binary image data to be recorded by the record unit 16. The RAM 13 also stores binary image data which is obtained by modulation by the modem 16 and output to a telephone network 20 through the NCU 19.

The RAM 13 demodulates an analog waveform input from the telephone network 20 through the NCU 19 and the modem 18 and stores this binary data.

The non-volatile RAM 14 can appropriately store data to be stored even in an OFF state of the power source of the facsimile apparatus. The non-volatile RAM 14 is one of the registering means for storing destination names and telephone numbers in a one-to-one correspondence.

The CPU 11 transmits a destination name corresponding to an input destination telephone number to a destination facsimile apparatus on the basis of a program stored in the ROM 12.

The CG (character generator) 15 comprises a ROM for storing characters represented by JIS (Japanese Industrial Standards) or ASCII codes and extracts character data corresponding to a predetermined code by two-byte data, as needed, under the control of the CPU 11.

The record unit 16 records and outputs recording data stored in the RAM 13 as a hard copy under the control of the CPU 11.

The read unit 17 binarizes data read by utilizing a CCD and sequentially transmits the read data to the RAM 13 under the control of the CPU 11. A loading state of an original on the read unit 17 can be detected by an original sensor such as a photosensor arranged in a convey path of the original. An original detection signal is input to the CPU 11.

Under the control of the CPU 11, the modem 18 modulates transmission data stored in the RAM 13, and outputs the modulated data onto the telephone network 20 through the NCU 19. The modem 18 receives an analog signal through the NCU 19 and modulates the analog signal. The resultant binary data is stored in the RAM 13.

The NCU 19 switches the telephone network to the modem 18 or a telephone set 1a under the control of the CPU 11.

The telephone set 1a is a telephone set integrally arranged with the facsimile apparatus 1, and the dial operation section is integrally formed as the operation unit 4 to be described below. More specifically, the telephone set 1a includes a handset, a speech network, a dial, a ten-key pad, and one-touch keys.

The operation unit 4 includes a key for starting image transmission or reception, a mode selection key for designating an operation mode to a fine, standard, or automatic reception mode, and a dialing ten-key pad. The CPU 11 detects depression states of these keys and controls the above components in accordance with a detected key depression state.

The operation unit 4 in this embodiment includes the light-receiving elements N·to $N_7$ and the microswitch 10.

The display unit 5 comprises a liquid crystal display unit for displaying a maximum of 16 digits or characters in a line and displays predetermined characters under the control of the CPU 11. The display unit 5 is located on the operation unit 4.

Figure 9:
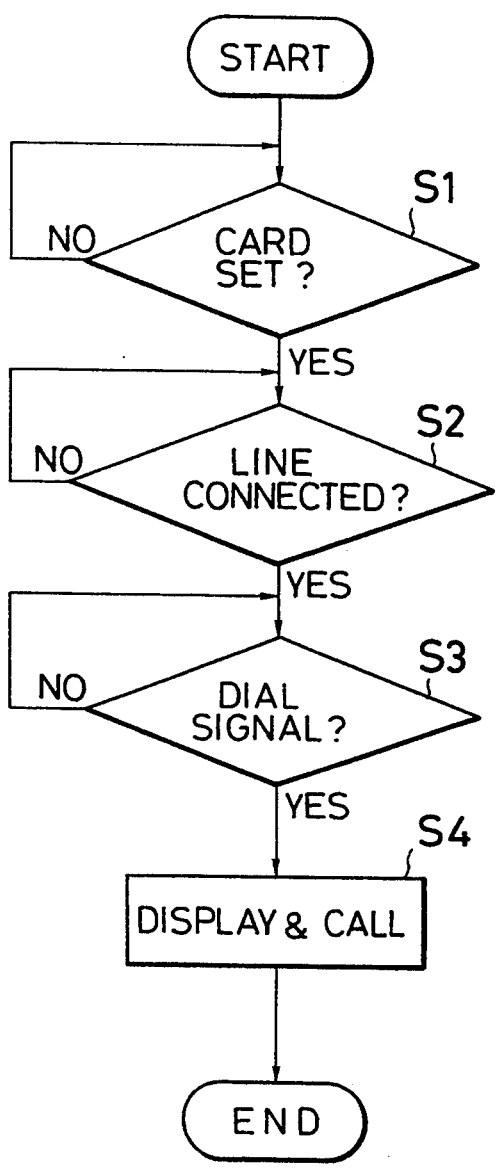
FIG. 9 is a flow chart for explaining an operation of the apparatus shown in FIG. 8.

An operation of this embodiment will be described with reference to FIG. 9.

When a call is to be made using a card, an operator sets the card 7 into the mounting portion 8. The microswitch 10 shown in FIG. 1 is laid down, and the CPU 11 detects in step S1 that the card 7 is set in the mounting portion 8 through the operation unit 4. When the operator picks up the handset of the telephone set 1a or depresses an on-hook button $4_1$ to connect the telephone line (step S2), the CPU 11 detects through the NCU 19 that the line is connected. In this state, the CPU 11 detects whether light is incident on the light-receiving elements $N_1$ to $N_7$ at predetermined intervals (step S3).

As shown in FIG. 7, a desired destination is searched on the display unit $7_1$ of the card 7 (the card 7 may be set in the mounting portion 8 after the desired destination is searched), and a start key $7_6$ is depressed. The light-emitting diodes $L_1$ to $L_7$ corresponding to numbers "0" to "9" on the lower surface of the card are turned on in accordance with dial information. At this time, the light-receiving elements $N_1$ to $N_7$ corresponding to the numbers "0" to "9" receive light from the corresponding to the light-emitting elements. When the CPU 11 scans the light-receiving elements $N_1$ to $N_7$ and each scanned element is ON, the number corresponding to the ON element is immediately stored in the RAM 13. The subsequently sent information is also stored in the RAM 13, and the stored information is displayed on the display unit 5 by using the CG 15. A call is then made upon reception of all dial information (step S4).

When the card 7 is not mounted or a line is disconnected even if the card 7 is mounted, the CPU 11 does not detect the states of the light-receiving elements $N_1$ to $N_7$.

As described above, when the card is mounted on the facsimile apparatus and the line is not connected, light information from the light-receiving elements in the facsimile apparatus is not fetched by the CPU, thereby preventing an operation error caused by external light.

Figure 10:
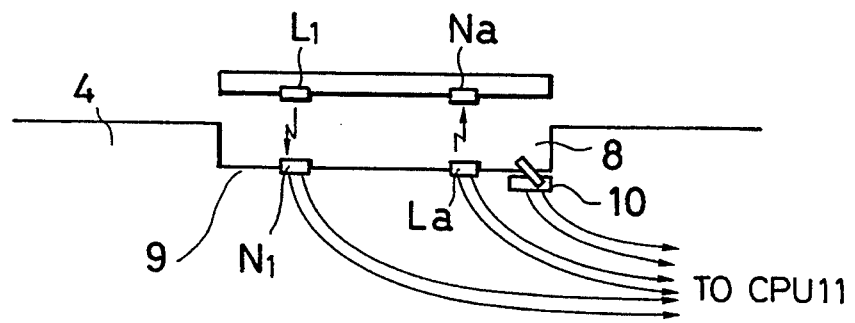
FIG. 10 is a sectional view of the mounting portion according to a modification of FIG. 6.

FIG. 10 shows an arrangement wherein a light-receiving element Na is arranged in the card 7, a light-emitting element La is arranged in the mounting portion 8, a dial information transfer enable signal is supplied from the telephone set to the card by means of light upon a line connection, the card receives this enable signal to transmit dial information to the telephone set by means of light, and dial information exchange is started upon the line connection.

Figure 11:
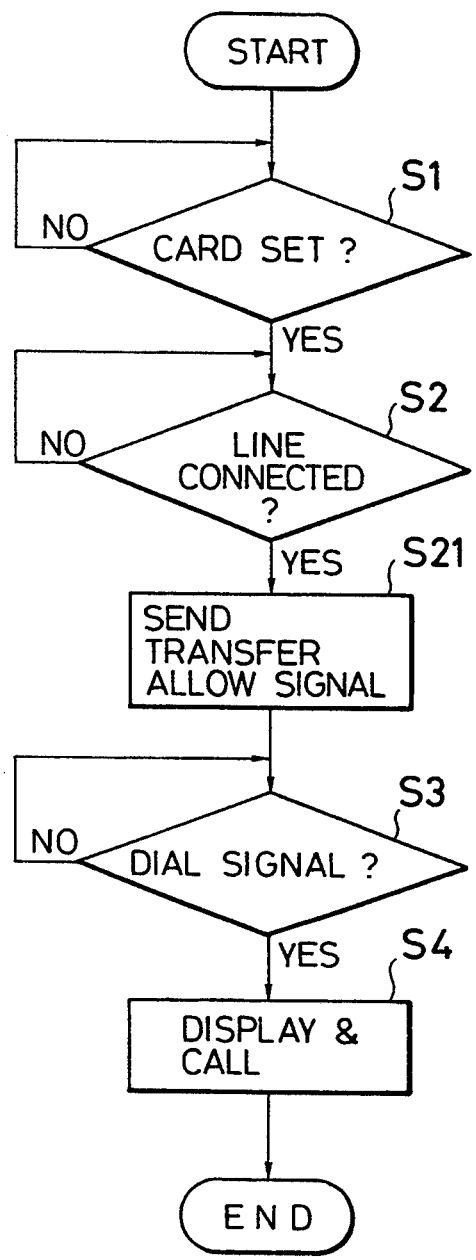
FIG. 11 is a flow chart of the apparatus having the mounting portion shown in FIG. 10.

An operation of the above modification will be described with reference to FIG. 11. According to a method of making a call using a card, the card 7 is mounted in the mounting portion 8 and a desired destination is searched on the display unit. Note that the card 7 may be set in the mounting portion 8 after the desired destination is found. The CPU 11 detects from a signal from the microswitch 10 that the card 7 is set in the mounting portion 8 (step S1).

The operator picks up the handset or depresses the on-hook button $4_1$ to connect the telephone set line. The CPU 11 detects through the NCU 19 whether the line is connected. When the CPU 11 detects that the line is connected while the card is set, the CPU 11 causes the transfer signal generation light-emitting element La to emit light (step S21).

Upon detection of the transfer enable signal by the light-receiving element Na arranged in the card, the card 7 transfers dial information. The dial information is transferred between the light-emitting diodes $L_1$ to $L_7$ corresponding to the numbers "0" to "9" on the card side and the light-receiving elements $N_1$ to $N_7$ corresponding to the numbers "0" to "9" on the facsimile apparatus 1.

After the CPU 11 operates the transfer enable signal generation light-emitting diode La, the CPU 11 detects whether light is incident on the light-receiving element Na (step S3). When the light-receiving element Na receives light, the CPU 11 sequentially stores the dial information in the RAM 13. When the last digit of the telephone number is received, a call is made on the basis of the dial information stored in the RAM 13 (step S4).

The third embodiment of the present invention will be described below.

The third embodiment includes a card position regulating portion in addition to the arrangement of the second embodiment.

The same reference numerals as in the first embodiment denote the same parts in the third embodiment, and a detailed description thereof will be omitted.

Figure 12:
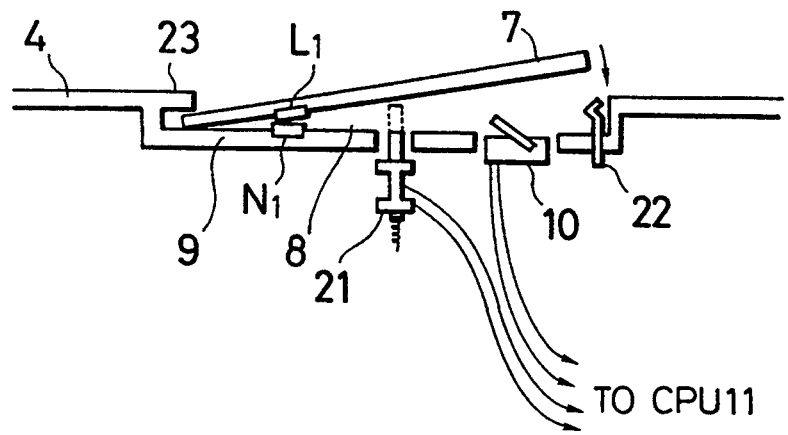
FIG. 12 is a sectional view showing an arrangement having a card removal preventive portion in the mounting portion of FIG. 5 according to the third embodiment of the present invention.

FIG. 12 shows a card mounting portion 8. This portion includes a plunger 21 and an elastic member 22 such as a spring in addition to the switch 10 shown in FIG. 6. At the same time, a hook portion 23 is formed in a mounting portion 8 to hook a card 7. Other arrangements are the same as those in the first embodiment.

An operation of this embodiment will be described with reference to FIG. 13.

The card 7 is mounted in the mousing portion 8. The card 7 is held by the hook portion 23 and the elastic member 22. A CPU 11 detects correct mounting of the card 7 in accordance with a detection signal from the microswitch 10 (step S1) and controls an NCU 19 to connect a line (step S12). The CPU 11 waits for telephone number information form the card 7. A destination is searched on a display unit $7_1$ of the card 7 or is found before the card 7 is set, and the operator depresses a start key $7_6$ as a telephone number transfer button. The telephone number is transferred to the facsimile apparatus (step S3), and the CPU 11 calls the desired destination with the transferred telephone number (step S4).

When facsimile communication is finished (step S15), the CPU 11 disconnects the line and drives the plunger 21 to move the card 7 to a position where the microswitch 10 is turned off, thereby preventing a line from being connected again (step S16).

In order to make a call from the telephone set, the microswitch is controlled in accordance with an off-hook state.

As described above, the switch is arranged in the card mounting portion, and the operator picks up the handset or depresses the on-hook button upon mounting of the card in the mounting portion, thereby connecting the line.

Figure 14:
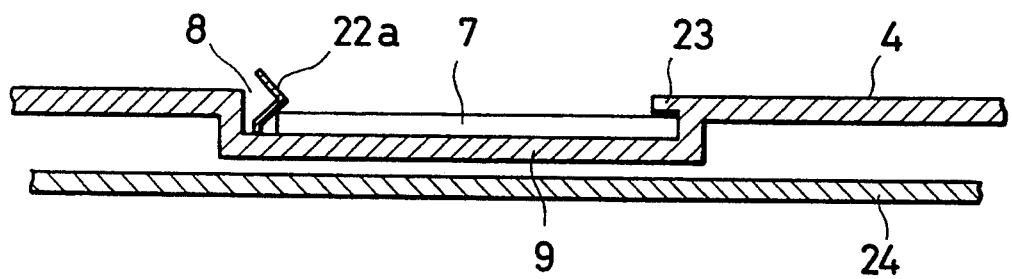
FIG. 14 is a sectional view an arrangement having a card removal preventive portion and a position regulating portion in the mounting portion shown in FIG. 5 according to the fourth embodiment of the present invention.

The fourth embodiment of the present invention will be described below. In the fourth embodiment, structures of an elastic member 22 such as a spring and a hook portion 23 are described in detail, and other arrangements are the same as those in the first embodiment. Referring to FIG. 14, a mounting portion 8 10 has the hook portion 23, and a leaf spring 22a is mounted on the opposite side. One side of a card 7 is hooked by the hook portion 23 and the opposite side is pressed downward in FIG. 14. Then, the leaf spring 22a serving as an elastic member is deflected to the left. When the corresponding side of the card 7 passes through a vertex of the leaf spring 22a, the leaf spring 22a biases the card 7 in the downward and horizontal directions. The card 7 abuts against a placing portion 9 on the bottom surface of the mounting portion 8 and is held in position. A printed circuit board 24 is located below the placing portion 9.

Figure 15:
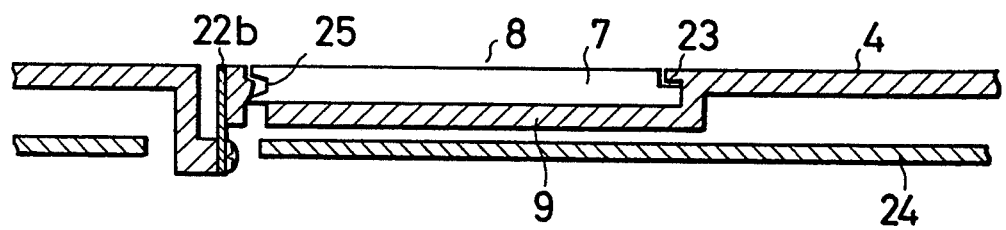
FIG. 15 is a sectional view showing a modification of a spring member shown in FIG. 14.

FIG. 15 is a modification of FIG. 14. In this modification, the surface of an operation unit 4 has the same level as that of the surface of the card 7. A leaf spring 22b has an elastic abutment body engaged with a groove 25 formed on the corresponding side surface of the card 7. The hook portion 23 is engaged with a notch formed on the corresponding side of the card 7.

Since the operation unit 4 is inclined toward the front surface of the main body and when the hook portion 23 is formed at the front side (i.e., a lower side), the user of the facsimile apparatus need not push the card 7 to hook its side by the hook portion 23 and can easily set the card 7 in the mounting portion 8.

Figure 16:
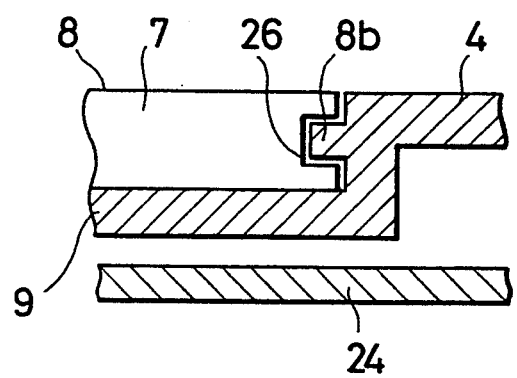
FIG. 16 is a sectional view showing the first modification of the card removal preventive portion shown in FIG. 14.

FIG. 16 shows the first modification of the hook portion 23 shown in FIG. 15. The card 7 has a hook groove 26, and the mounting portion 8 of the facsimile body 1 has a projection 8b engaged with the groove 26. This modification is proposed so that the surface of the operation unit 4 has the same level as that of the card 7.

Figure 17:
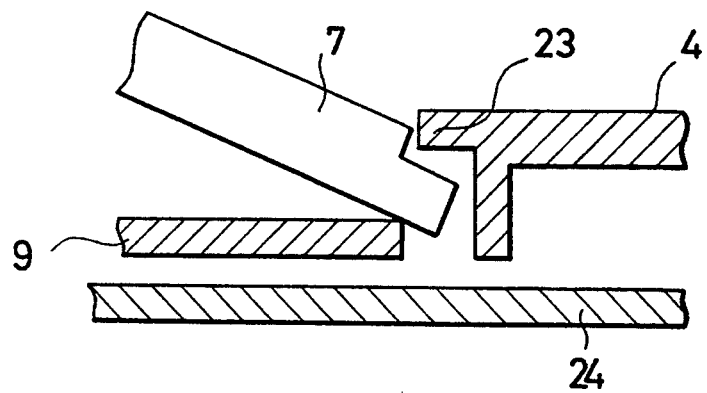
FIG. 17 is a sectional view showing the second modification of the card removal preventive portion shown in FIG. 14.

FIG. 17 shows the second modification. A space is formed below the hook portion 23 shown in FIG. 15 and serves as an escape portion upon insertion of the card 7. Therefore, even if the surface level of the hook portion 23 is the same as that of the card 7, no problem is posed.

The fifth embodiment of the present invention will be described below. The fifth embodiment is obtained by inhibiting removal of a card 7 during communication in the arrangement of the fourth embodiment, and other arrangements of the fifth embodiment are the same as those of the fourth embodiment.

Figure 18:
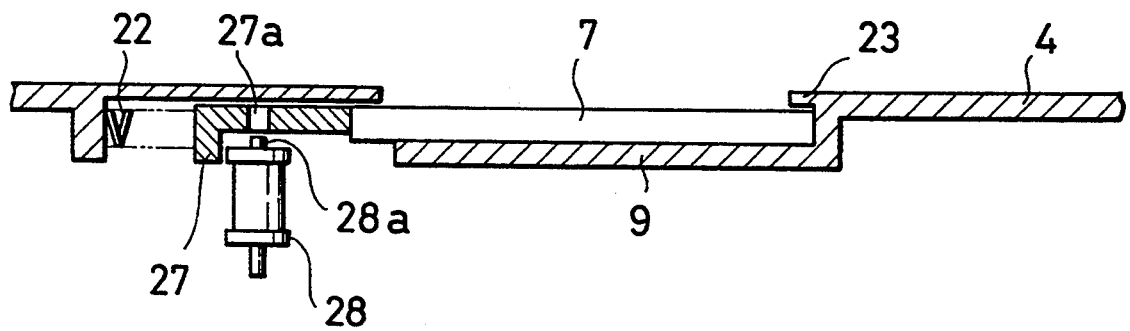
FIG. 18 is a sectional view showing a card removal preventive unit mounted in the mounting portion shown in FIG. 14 according to the fifth embodiment of the present invention.
Figure 19:
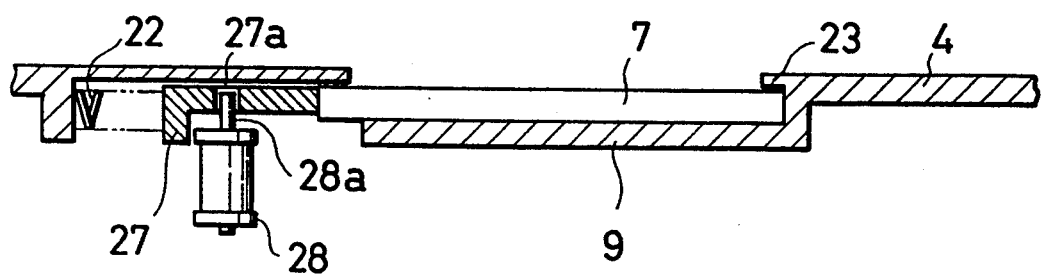
FIG. 19 is a sectional view showing a state during data communication in the structure of FIG. 18.
Figure 20:
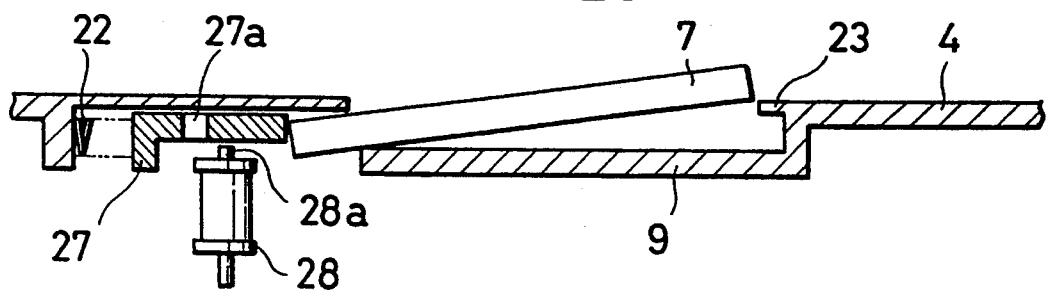
FIG. 20 is a sectional view showing a state wherein the card is removed from the structure in FIG. 18.

Referring to FIGS. 18 to 20, a slide member 27 is mounted in the main body to be slidable in the right-and-left direction. The slide member 27 is biased to the right (FIGS. 18 to 20) and has a hole 27a. An actuator 28 is located in a normal state (FIG. 18) upon its energization. A hook portion 23 is formed at an end of a mounting portion 8 which opposes the end having the slide member 27.

Referring to FIG. 18, when the card 7 is moved to the left, the card 7 and the slide member 27 are moved to the left against a biasing force of the spring 22. While card 7 is pulled to the left, it can be pulled up and removed (FIG. 20).

When communication is performed between the card and the facsimile body 1, the actuator 28 is kept energized to move a plunger 28a upward. The plunger 28a is fitted in the hole 27a of the slide member 27, and the slide member 27 cannot be moved to the left. In this case, the card 7 cannot be removed (FIG. 19).

Figure 21:
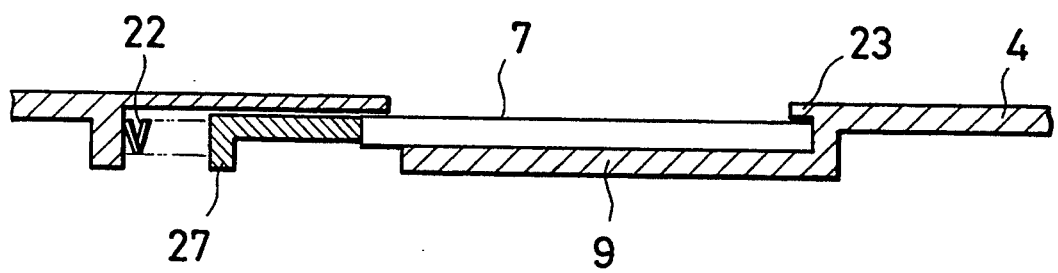
FIG. 21 is a sectional view showing a modification of FIG. 18.
Figure 22:
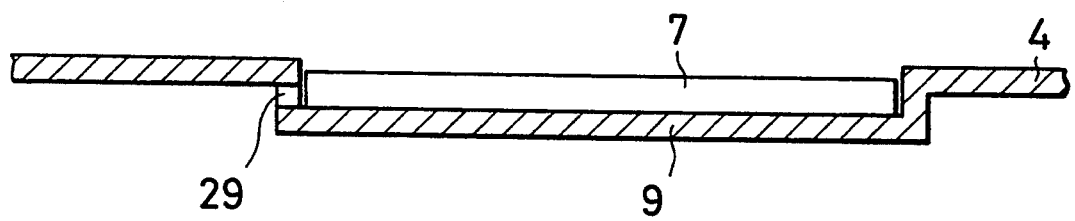
FIG. 22 is a sectional view showing the structure in FIG. 21 from a lateral direction.
Figure 23:
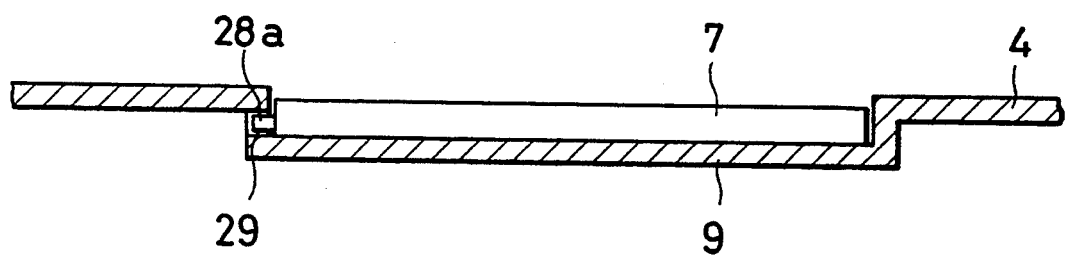
FIG. 23 is a sectional view showing a state during data communication in the structure in FIG. 22.

FIGS. 21 to 23 show a modification of FIGS. 18 to 20. This modification has a solenoid 28 as the actuator shown in FIGS. 18 to 20. FIG. 21 shows a normal state. Since there is no obstacle to the left of the card 7, the card 7 can be freely moved to the left (FIG. 22). FIG. 23 shows a lateral view illustrating a state during data communication. The plunger 28a of the solenoid (not shown) arranged in the card 7 is fitted in a hole 29, and the card 7 cannot be moved to the left. Therefore, the card 7 cannot be removed.

The fifth embodiment does not describe communication detecting means. Several communication detecting means are available as follows.

(a) When communication is performed from the main body to the card, a lock control means arranged in the facsimile main body can detect communication under the control of hardware or the CPU.

(b) When communication is performed from the card to the main body, an LED and a light-receiving element are additionally arranged to signal that communication is being performed. When the LED is ON, this state is detected as a "communicating" state.

(c) When data transfer is performed by, e.g., serial communication, start and end signals are predetermined. A facsimile apparatus which detects the start of data transmission starts locking and releases locking upon detection of the end of data transmission.

(d) As in (c), detection of only the start signal is determined, and the facsimile apparatus holds locking for a maximum data communication time or more.

(e) As in (c), detection of only the start signal is determined. The facsimile apparatus holds locking for a few seconds upon detection of an ON state of the LED. During data communication, since any one of the LEDs is ON, the lock start time is assured, and locking is released upon a lapse of the last data transfer.

According to this embodiment described above, there are provided a means for optically or electrically detecting the data communicating state and a means for automatically switching between the card removal disable state and the card removal enable state. During communication, the card cannot be removed from the facsimile main body. Therefore, communication is not undesirably interrupted, and an operation error can be prevented.

A signal representing that data communication is being performed may be sent from the facsimile main body to the card.

The card and the facsimile apparatus may be arranged to allow exchange of the data communication start and end signals.

The card is arranged so that it cannot be removed from the main body during data communication.

It is preferable to arrange the card so that the signal representing that data communication is being performed can be sent to the facsimile main body.

When data transfer is performed by, e.g., serial communication, the start and end signals are determined, and the facsimile main body which detects the start of data transfer starts locking and releases locking upon detection of the end signal.

The sixth embodiment of the present invention will be described. This embodiment shows the best layout of the switch in the third embodiment, and other arrangements of the sixth embodiment are the same as those in the third embodiment except for a plunger 21.

Figure 24:
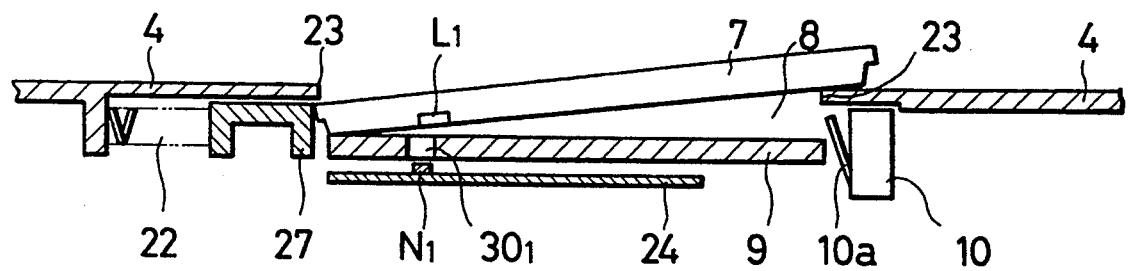
FIG. 24 is a sectional view showing the optimal layout of the card sensor shown in FIG. 12 according to the sixth embodiment of the present invention.

FIG. 24 shows a state wherein a card 7 is inserted into a mounting portion 8. Hook portions 23 are formed at opposite sides of the mounting portion 8, and a slide member 27 is arranged at one side of the mounting portion and is biased to the right by a spring member 22. A microswitch 10 serving as a card sensor is arranged below one hook portion 23 so that an actuator 10a of the microswitch 10 is directed inward.

A printed circuit board 24 is located below a placing portion 9, and light-receiving elements $N_1$ to $N_7$ are arranged on the printed circuit board 24. Light-transmitting portions $30_1$ to $30_7$ for transmitting light emitted from light-emitting diodes $L_1$ to $L_7$ are formed in the placing portion 9.

In this state, the actuator 10a of the microswitch 10 is kept open, and the switch 10 is kept OFF. Although external light is incident on the light-receiving elements $N_l$ to $N_7$, they are not operated because the microswitch 10 is kept OFF.

Figure 25:
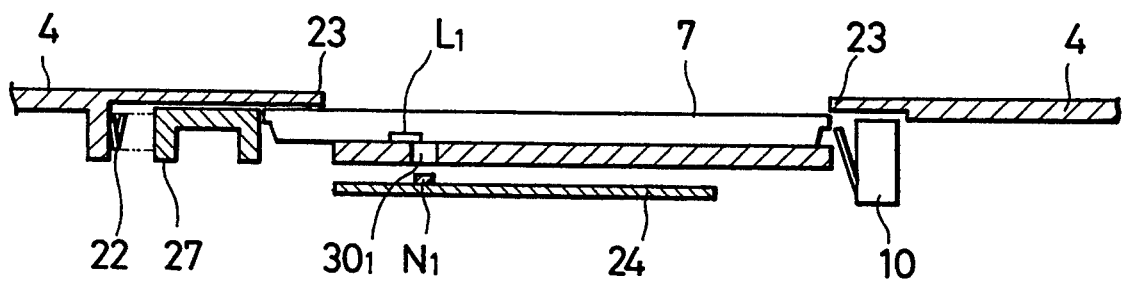
FIG. 25 is a sectional view showing a state wherein the card shown in FIG. 24 is removed.

FIG. 25 shows a state wherein the card 7 is moved to the left against a biasing force of the spring member 22 so that the noninserted side of the card 7 is inserted into the mounting portion 8 from the state shown in FIG. 24. The card 7 is kept urged to the left by the spring member 22 through the slide member 27. In this case, the bottom surface of the card 7 is kept in tight contact with the placing portion 9, so that the light-transmitting portions $30_1$ to $30_7$ are covered with the card 7. No light is incident on the light-receiving elements $N_1$ to $N_7$. At the same time, the microswitch 10 is kept OFF.

Figure 26:
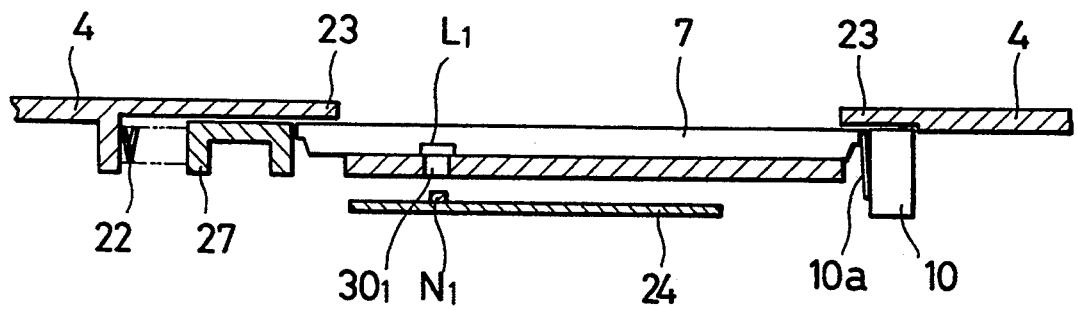
FIG. 26 is a sectional view showing a state wherein the card is completely mounted in FIG. 24.

FIG. 26 shows a state wherein the hand is released from the card 7 from the state shown in FIG. 25. Since the card 7 is not held by the hand, the card 7 is moved to the right by the biasing force of the spring member 22 and urges the actuator 10a of the microswitch 10. That is, the actuator 10a is in contact with an abutment portion (not shown) and is stopped. At this time, both the hook portions 23 prevent the card 7 from moving upward, so that the card 7 is fixed in position.

When the microswitch 10 is ON, a circuit for the light-receiving elements $N_1$ to $N_7$ is operated. At this time, since the light-transmitting portions $30_1$ to $30_7$ are covered with the card 7, external light is not incident on these light-transmitting portions. Therefore, it is understood that the light-receiving elements $N_1$ to $N_7$ respond to only light emitted from the light-emitting elements $L_l$ to $L_7$.

The operation for causing the microswitch 10 to detect insertion of the card 7 upon movement of the card 7 in the urging direction has been described above. However, insertion of the card 7 can be detected at a side or bottom surface. As a matter of course, the same effect as described above can be obtained even if another detecting means such as a reflecting or transmitting photocoupler is used.

Figure 27:
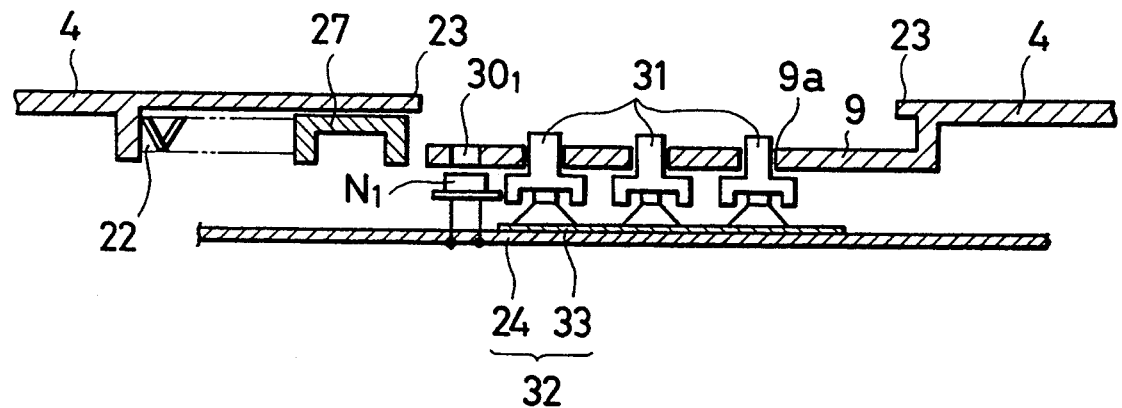
FIG. 27 is a sectional view showing an arrangement of the card sensor (FIG. 12) constituted by a one-touch key according to the seventh embodiment of the present invention.
Figure 28:
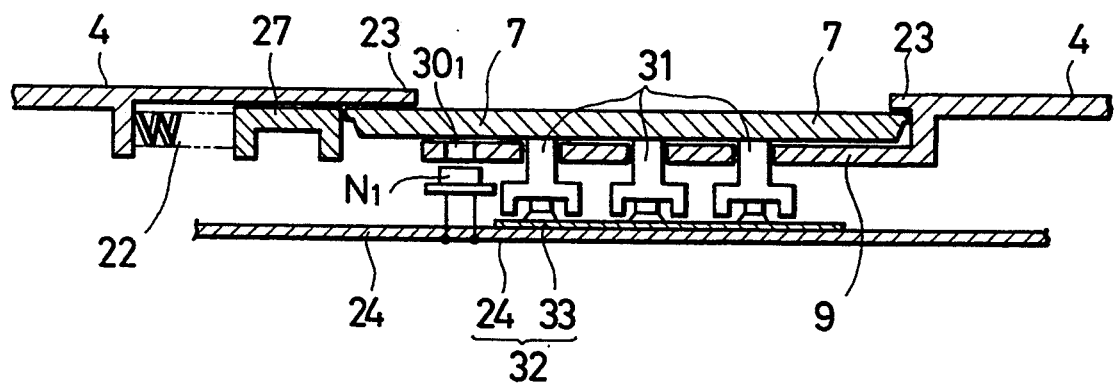
FIG. 28 is a sectional view showing a state wherein a card is mounted in the state shown in FIG. 27.

The seventh embodiment of the present invention will be described below. In the seventh embodiment, the microswitch in the third embodiment is constituted by a one-touch key in the facsimile apparatus. Referring to FIGS. 27 and 28, a slide member 27 biased by a spring member 22 to the right is arranged below an operation unit 4. A portion of each one-touch key 31 is inserted into a hole 9a formed in a placing portion 9. A switch 32 (consisting of rubber 33 and a printed circuit board 24) is arranged under each one-touch key 31. Each switch 32 is turned on upon depression of the corresponding one-touch key 31. The one-touch key is used as a means for detecting use of a card 7. Light-receiving windows $30_1$ to $30_7$ are formed in the placing portion 9. The windows are constituted by simple holes or holes filled with a light-transmitting resin. Light-receiving elements $N_l$ to $N_7$ serving as switches are respectively arranged below the light-receiving windows $30_1$ to $30_7$ and are electrically connected to the printed circuit board 24. When the card 7 is removed, since the one-touch keys 31 are kept released, all the switches 32 are kept OFF.

FIG. 28 shows a state wherein the card 7 is mounted. Since the card 7 is biased to the right by the spring member 22 through the slide member 27, the card 7 is hooked by a right hook portion 23 and is not removed upward.

When the card 7 is mounted, the one-touch keys 31 are depressed by the bottom surface of the card 7. Upon depression of the one-touch keys 31, the switches 32 are turned on.

As described above, when the card 7 is mounted, the one-touch keys 31 are not required because a telephone number is input from the card 7, and the one-touch keys 31 are covered by the card 7. When the card 7 is removed, the one-touch keys 31 appear on the card placing portion 9 and can be used although the number of one-touch keys is small.

In this embodiment, when the card is mounted, all the one-touch keys 31 are kept depressed. When the card 7 is removed and is not present in the card placing portion 9, the facsimile apparatus is not used with the card in this state. Therefore, when all the one-touch keys 31 are kept depressed, it is apparent that the card 7 is mounted. Therefore, this can be used as a detecting means.

Figure 29:
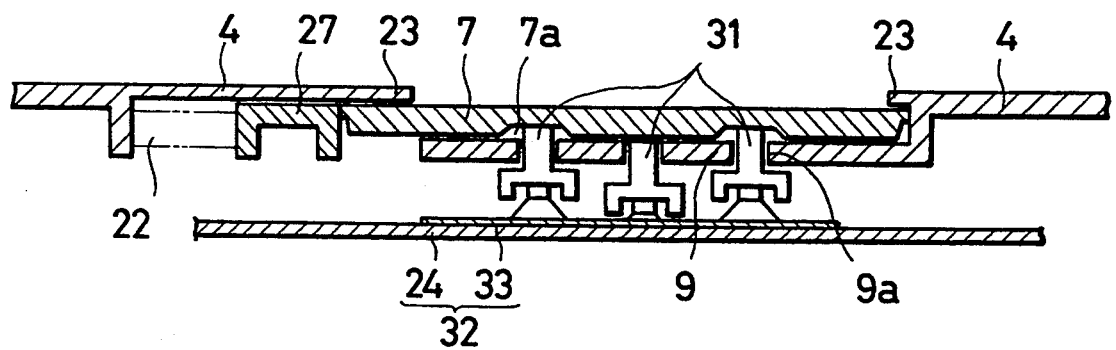
FIG. 29 is a sectional view showing a modification of FIG. 28.

FIG. 29 is a sectional view showing the same part as in FIG. 28. Recesses 7a are formed on the bottom surface of the card 7, and the corresponding one-touch keys 31 are not depressed. All the one-touch keys may be simultaneously depressed by a hand of the operator, and, in this case, an operation error may occur. However, a possibility of depression of the one-touch keys 31 with a predetermined pattern, as shown in FIG. 9, is very low. Therefore, a system having a minimum possibility of an operation error can be provided.

If cards have different patterns, the facsimile apparatus can serve as a means for discriminating the type of card. As a matter of course, the facsimile apparatus can calculate the use frequency of each card.

When identical facsimile apparatuses are located in a single location and must be separately used in order to maintain different systems, different patterns in units of facsimile apparatuses can allow use of a specific card in a specific facsimile apparatus, thereby preventing inconvenience.

The eighth embodiment of the present invention will be described below. In the eighth embodiment, the light-receiving elements in the fourth embodiment are shielded.

Figure 30:
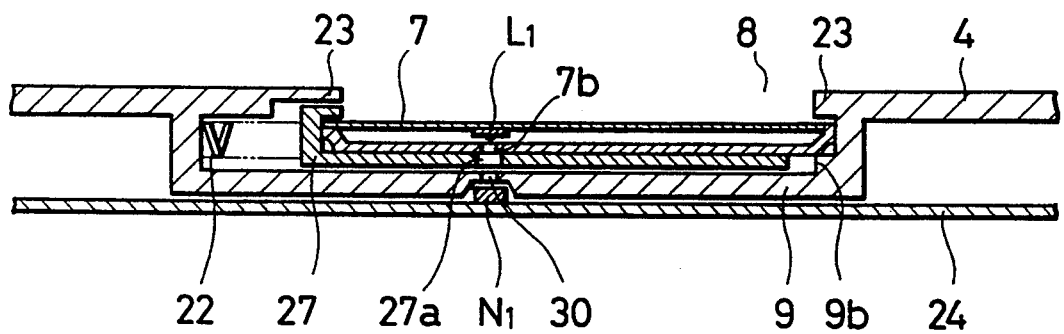
FIG. 30 is a sectional view showing a structure wherein a light-shielding mechanism is mounted in the light-receiving element shown in FIG. 2 according to the eighth embodiment of the present invention.
Figure 31:
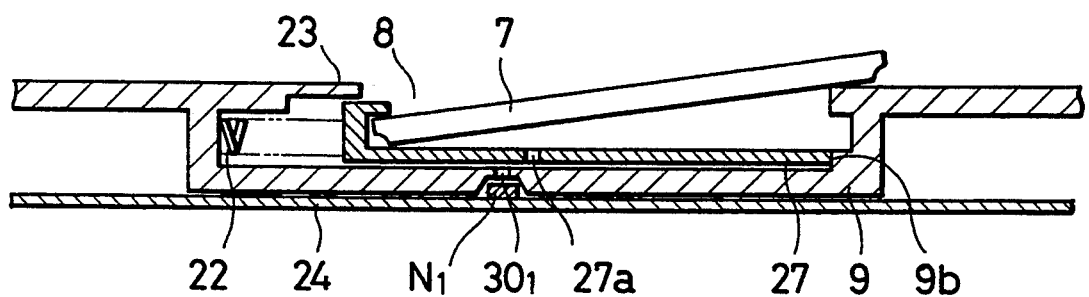
FIG. 31 is a sectional view showing a card detaching state in FIG. 30.

Referring to FIGS. 30 and 31, a slide member 27 serving as a light-shielding member for light-receiving elements $N_1$ to $N_7$ can receive a card and has a light-transmitting portion 27a. The slide member 27 is biased to the right by a spring member 22. When a card 7 is correctly set, the light-transmitting portion 27a coincides with the positions of light-emitting diodes $L_1$ to $L_7$ and a light-transmitting portion 7b arranged in the card 7. A placing portion 9 having light-transmitting portions $30_1$ to $30_7$ is located below the slide member 27. The light-receiving elements $N_1$ to $N_7$ are located immediately below the light-transmitting portions $30_1$ to $30_7$, respectively. The light-receiving elements $N_1$ to $N_7$ are arranged on a printed circuit board 24.

In this state, the light-emitting diodes $L_1$ to $L_7$ and the light-transmitting portion 7b of the card 7, the light-transmitting portions 27a and $30_1$ to $30_7$, and the light-receiving elements $N_1$ to $N_7$ are aligned in a line. Light from the light-emitting diodes $L_1$ to $L_7$ can reach the light-receiving elements $N_1$ to $N_7$, thereby transferring data.

As shown in FIG. 31, when the card 7 is pushed to the left and is moved upward, the card 7 can be removed. The slide member 27 is moved to the right by a biasing force of the spring member 22, abuts against a stopper 9b of the placing portion 9, and is stopped at the stopper 9b. At this time, although the light-receiving elements $N_1$ to $N_7$ and the light-transmitting portions $30_1$ to $30_7$ are aligned in a line, they are offset from the light-transmitting portion 27a of the slide member 27. Therefore, external light is shielded and does not reach the light-receiving elements $N_1$ to $N_7$, thereby preventing an operation error caused by a sunbeam or the like.

According to this embodiment, when the card 7 is not set, a means for shielding the light-receiving elements $N_1$ to $N_7$ from the light is provided. Therefore, an operation error can be prevented even if a dummy card is not used, and operability of the apparatus can be improved.

Figure 32:
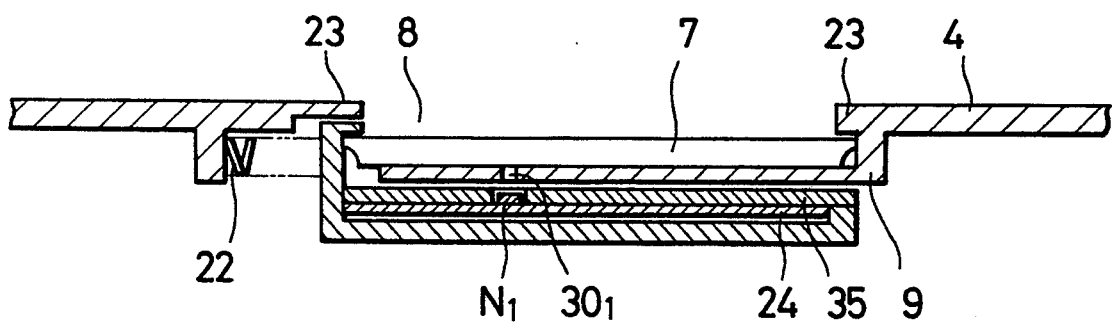
FIG. 32 is a sectional view showing a modification of FIG. 30.

FIG. 32 shows a modification of FIG. 30. The printed circuit board 24, the light-receiving elements $N_1$ to $N_7$ mounted on the printed circuit board 24, and a spacer 35 are fixed on the slide member 27. The light-transmitting portions $30_1$ to $30_7$ are formed in the placing portion 9. When the card 7 is correctly set, the light-emitting diodes $L_1$ to $L_7$ (not shown in FIG. 32) on the card 7, the light-transmitting portion 7b formed in the card 7, the light-transmitting portions $30_1$ to $30_7$, and the light-receiving elements $N_1$ to $N_7$ are aligned in a line. In this state, light from the light-emitting diodes $L_1$ to $L_7$ can reach the light-receiving elements $N_1$ to $N_7$, thereby transferring data.

When the card 7 is removed, however, the slide member 27 and the light-receiving elements $N_1$ to $N_7$ fixed thereon are moved to the right in FIG. 32. The light-receiving elements are shielded by the placing portion 9 and the spacer 35 which serve as the light-shielding means, thereby obtaining the same effect as in the above embodiment.

The same effect as described above can be obtained when the lid member is electrically driven upon detection of a card or an LED is rotated.

The same effect as described above can also be obtained by using an electric shutter using a liquid crystal.

The ninth embodiment of the present invention will be described below. In the ninth embodiment, a card 7 is laterally slid and mounted in a mounting portion 8, as shown in FIG. 33, unlike the first embodiment wherein the card 7 is inserted in the recessed mounting portion from the above.

Figure 33:
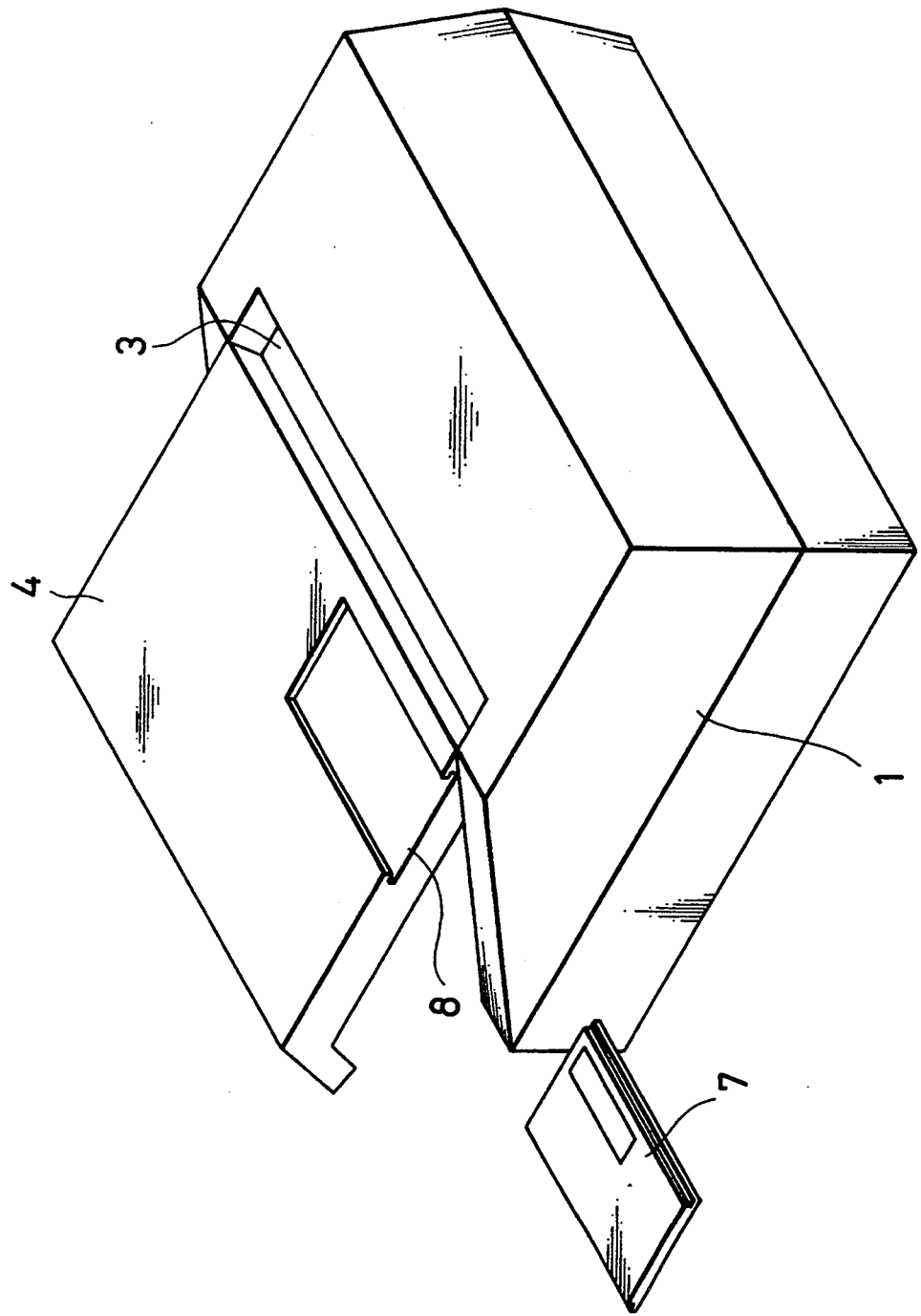
FIG. 33 is a perspective view showing a state wherein a card can be detached in the card mounting portion in FIG. 1 from the lateral direction according to the ninth embodiment of the present invention.

An operation unit 4 can be pivoted with respect to an apparatus main body 1, as shown in FIG. 33. In a normal use condition, a card insertion port of one side surface of the operation unit 4 is concealed and is not observed by the operator.

Figure 34:
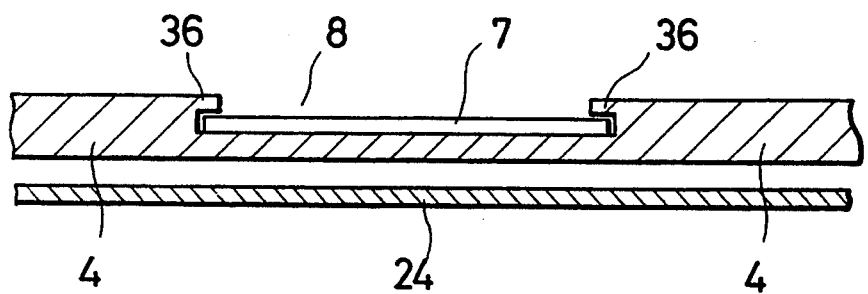
FIG. 34 is a sectional view of the mounting portion shown in FIG. 33.

As shown in FIG. 34, the mounting portion 8 comprises overhang portions 36 so that key grooves extend outward to form rails serving as a guide means. Since the card 7 can be slid into the mounting portion 8, stability of the card 7 can be improved as compared with the embodiment (FIG. 1) wherein the card 7 is simply placed on the placing portion 9. For this reason, although the surface level of the inserted card is equal to that of the opening unit 4, the rails as the overhang portions 36 do not extend upward from the surface of the operation unit 4.

When the card 7 is inserted in the mounting portion 8 deeply and the operation unit 4 is closed, the card 7 cannot be removed. When the card 7 is stopped midway along the rails, the case of the card 7 interferes closing, and the operation unit 4 cannot be closed. Therefore, no special countermeasure need be provided to prevent a mounting error of the card 7.

Figure 35:
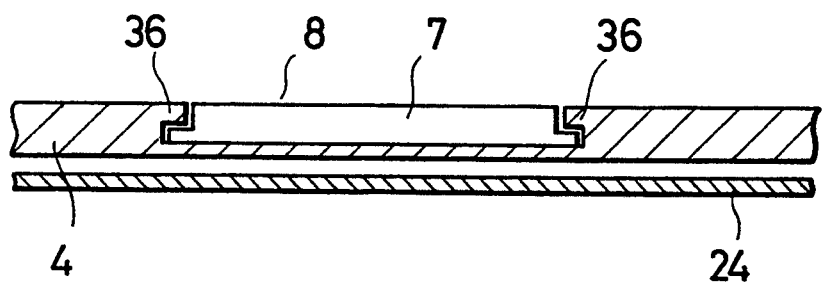
FIG. 35 is a sectional view showing the first modification of the mounting portion shown in FIG. 34.
Figure 36:
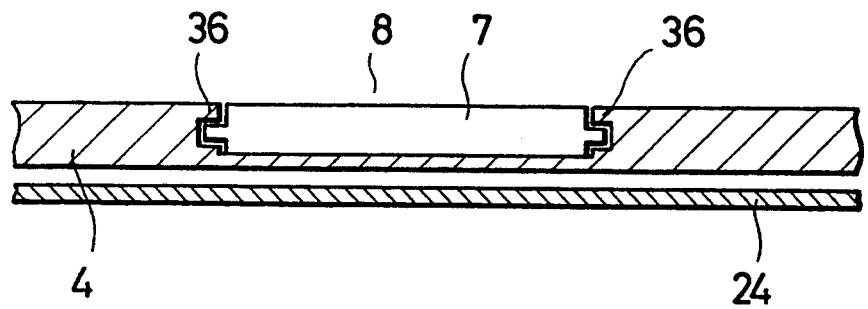
FIG. 36 is a sectional view showing the second modification of the mounting portion shown in FIG. 34.

In the modifications shown in FIGS. 35 and 36, projections extending outside the side surfaces of a card 7 are urged against overhang portions 36 of the mounting portion 8 to obtain rails serving as guide means, respectively. For this reason, the surface level of the operation unit 4 can be equal to that of the card 7, and a step can be eliminated to appropriately fit the card in the mounting portion.

Figure 37:
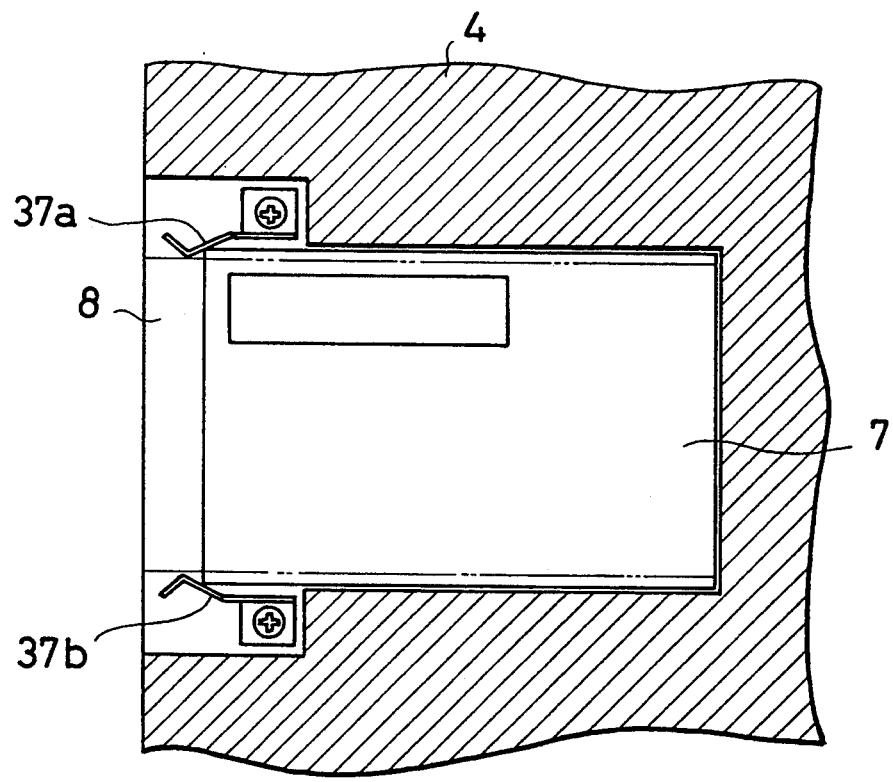
FIG. 37 is a plan view showing an arrangement having card position regulating members mounted in the mounting portion shown in FIG. 33.

In a structure shown in FIG. 37, leaf springs 37a and 37b are fixed to the operation unit 4 by screws. In this case, the card 7 is inserted from the left side to increase a distance between the leaf springs 37a and 37b. The card 7 is inserted, the card 7 is biased to the right, the right end of the card abuts against the deepest portion of the mounting portion, and the card is held in position. With the above arrangement, even if the facsimile apparatus body 1 is inclined, the card 7 is kept in position.

Figure 38:
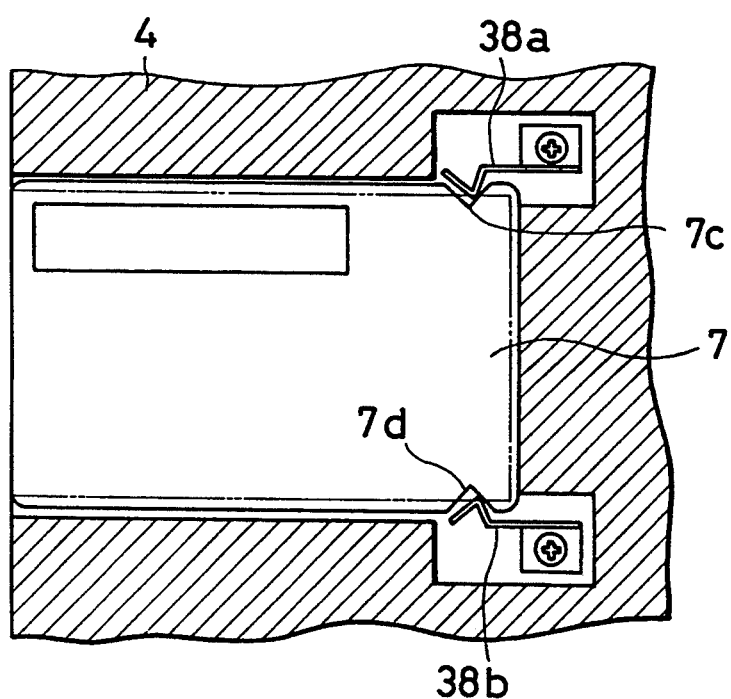
FIG. 38 is a plan view showing an arrangement wherein position regulating members shown in FIG. 37 are mounted on the other end portion of the card.

In a structure shown in FIG. 38, the card 7 has notches 7c and 7d, and the operation unit 4 has leaf springs 38a and 38b. The leaf springs 38a and 38b abut against the notches 7c and 7d at predetermined positions of the card 7 to bias the card 7 to the right. The right end face of the card 7 abuts against the operation unit 4, and the card 7 is fixed in position.

Figure 39:
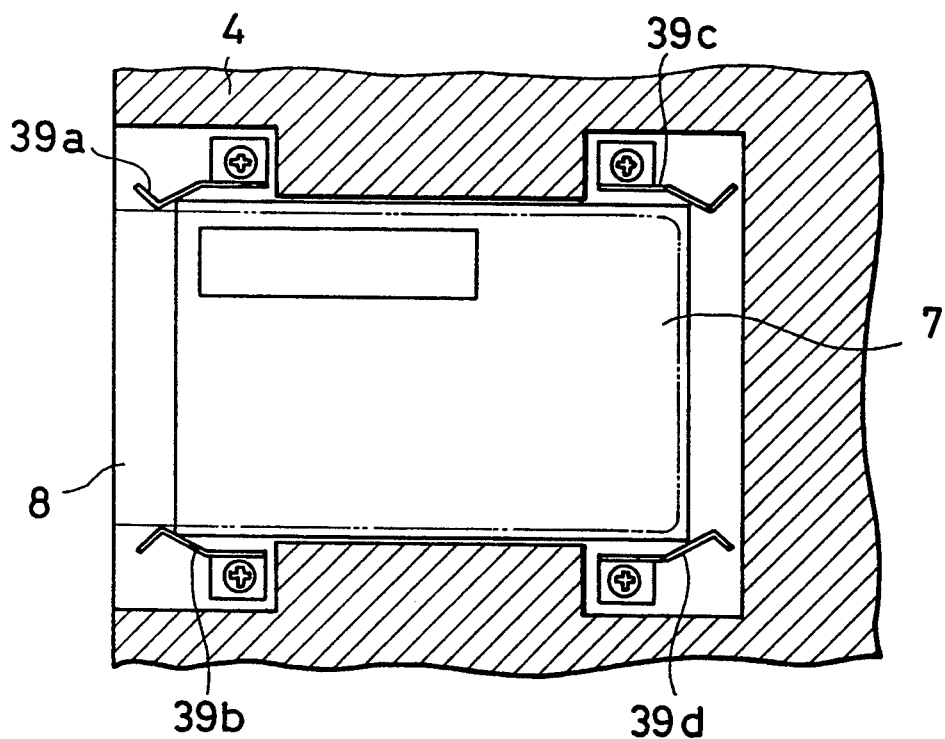
FIG. 39 is a plan view showing an arrangement wherein position regulating members shown in FIG. 37 are mounted on both ends of the card.

In a structure shown in FIG. 39, four leaf springs 39a, 39b, 39c, and 39d are fixed to the operation unit 4 by screws. When the card 7 is inserted in position, the corners of the card 7 abut against the corresponding leaf springs to hold the card 7.

Figure 40:
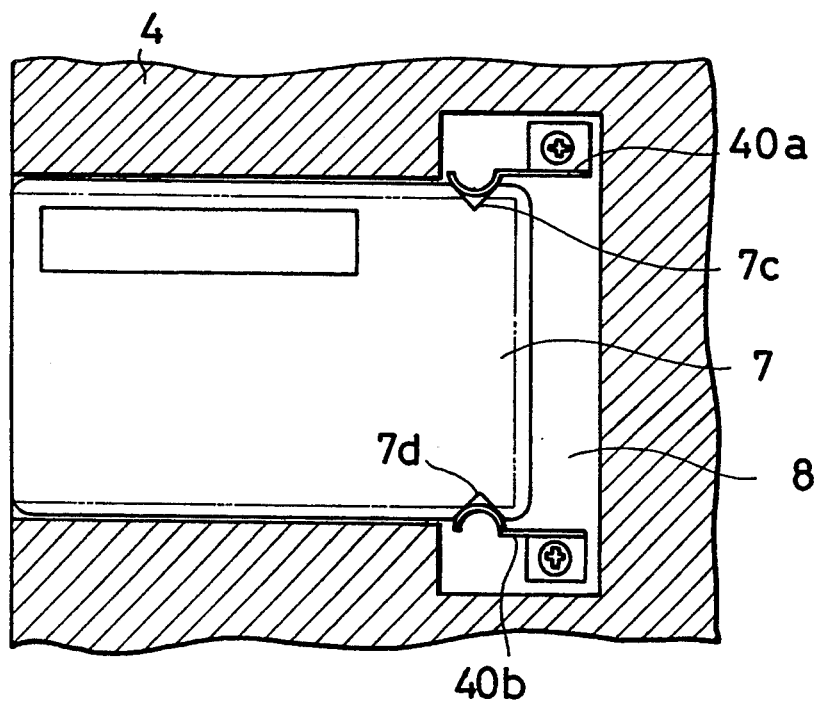
FIG. 40 is a plan view showing a modification of spring members shown in FIG. 38.

In a structure shown in FIG. 40, notches 7c and 7d, are formed in the card 7, and leaf springs 40a and 40b each having a semicircular distal end are fixed to the operation unit 4. When the card 7 is located in position, the leaf springs 40a and 40b are fitted in the notches 7c and 7d, respectively. Since the leaf springs 40a and 40b are fitted in the notches 7c and 7d, respectively, the card 7 can be stably held by a facsimile apparatus main body 1.

Figure 41:
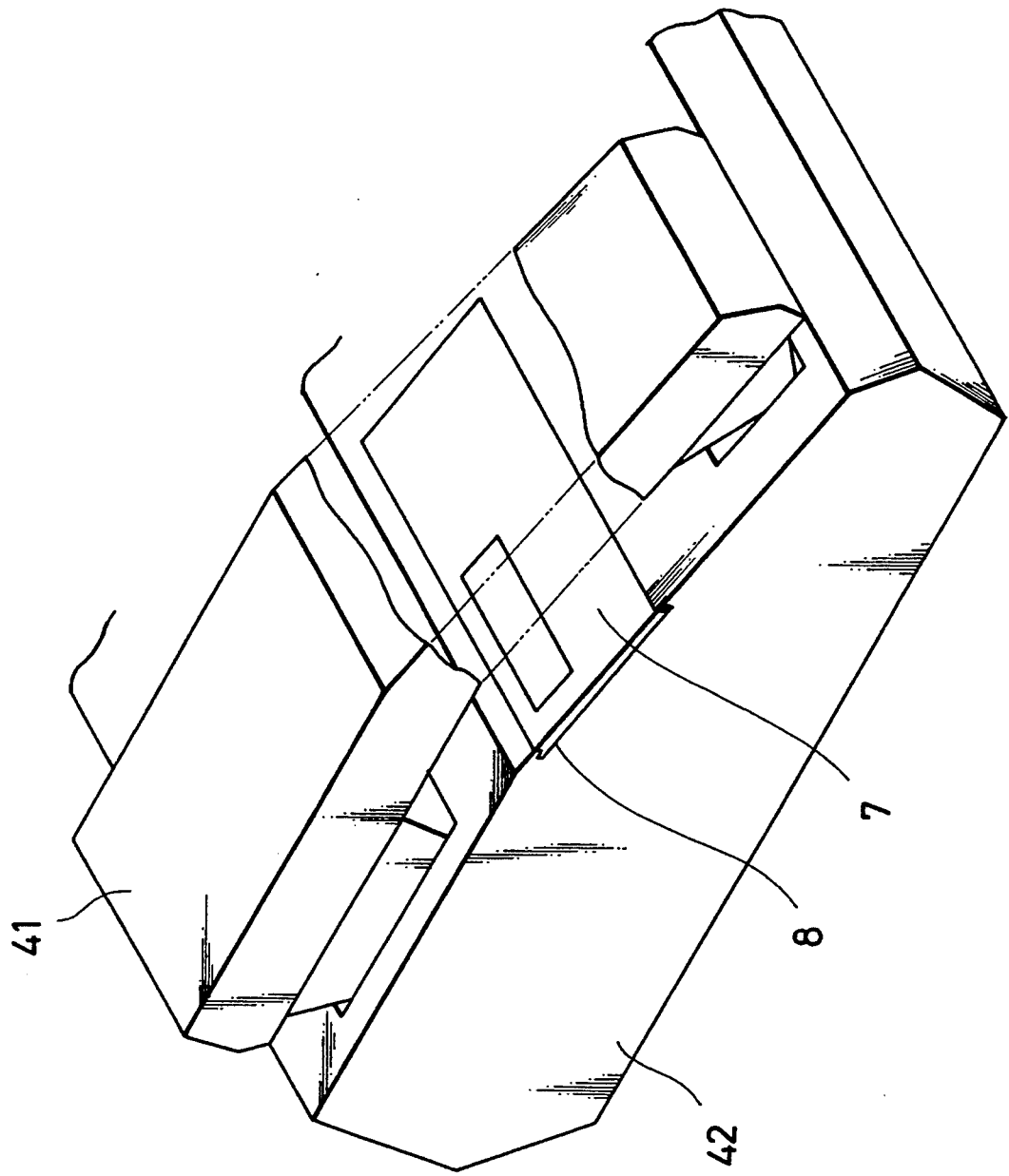
FIG. 41 is a perspective view showing an arrangement wherein the mounting portion shown in FIG. 33 is formed on the upper surface of a telephone main body.

The tenth embodiment of the present invention will be described below. In this embodiment, the mounting portion of the ninth embodiment is not located on the main body but on a handset table. Referring to FIG. 41, this facsimile apparatus includes a handset 41 and a handset table 42. The handset table 42 is formed in part of a main body 1 of the facsimile apparatus. The main body 1 is partially omitted in the tenth embodiment. A card mounting portion 8 is formed on the upper surface of the handset table. A card 7 is mounted on the mounting portion 8 to access a predetermined telephone number registered in the card 7, and the telephone number is transferred to the main body upon depression of the keys on the card 7. The facsimile apparatus dials to call a destination apparatus. In this case, when a line is not connected, dialing is not performed. Therefore, a user must pick up the handset 41 to connect the line and must depress the start key on the card 7. In this embodiment, however, the operator cannot touch the card 7 unless he or she picks up the handset 41. Therefore, dialing is always performed when the start key is depressed.

In this embodiment, the card 7 is almost covered by the handset 41. However, the liquid crystal display (LCD) unit may be located at a visible position, and only the start key may be located at an invisible position.

Figure 42:
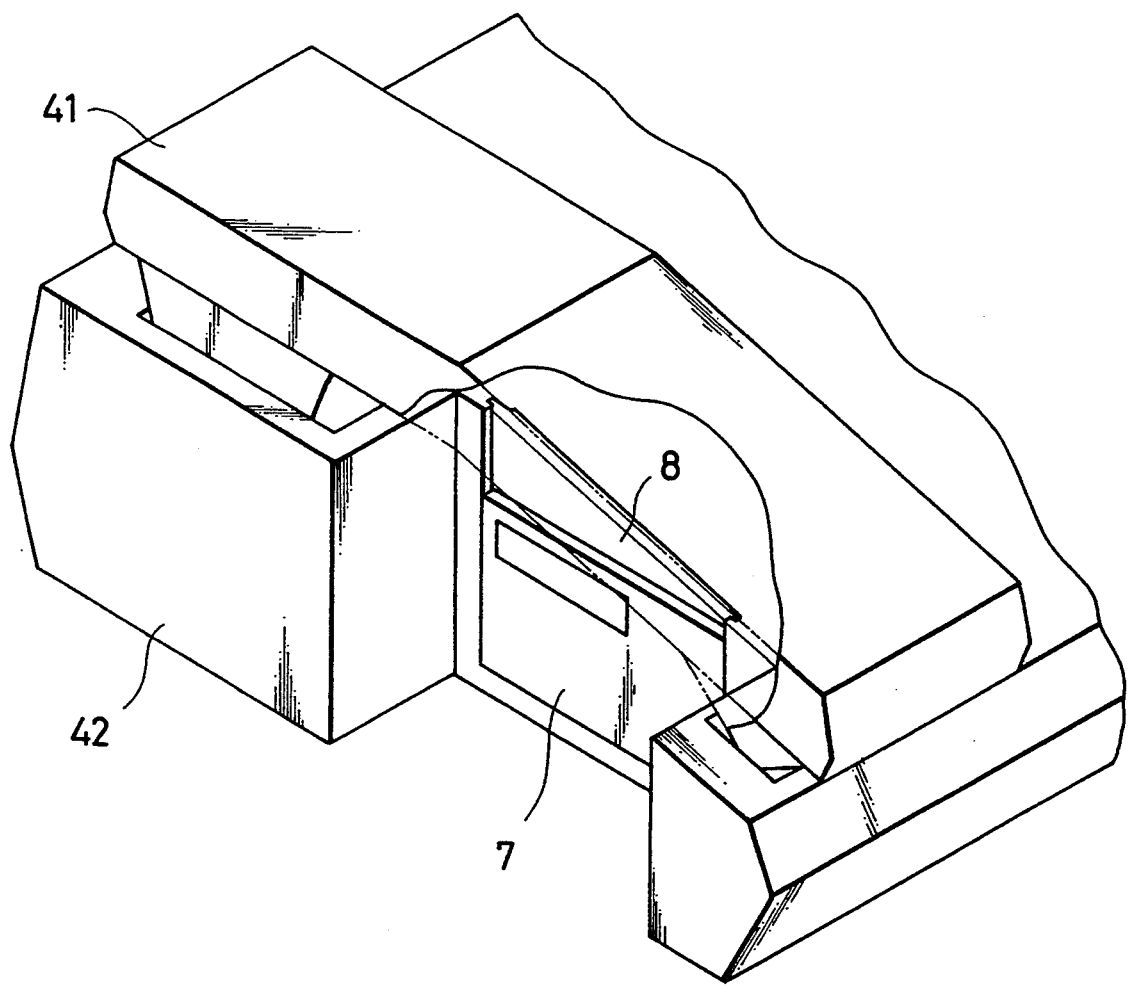
FIG. 42 is a perspective view showing an arrangement wherein the mounting portion shown in FIG. 41 is mounted on a side surface of the telephone main body.

The card mounting portion 8 need not be formed on the upper surface of the handset table 42, but may be formed on the side surface of the handset table, as shown in FIG. 42. In this case, the operator cannot touch the card 7 unless he or she picks up the handset 41. Therefore, a telephone line is connected upon depression of the start button.

According to the present invention as described above, a mounting portion is arranged to position a data memorandum card having data input keys, signal exchange is performed between the card and a main body, and the mounting portion has an opening for allowing operation of the input keys on the card. Users of the facsimile apparatus can have individual cards and their own abbreviated dial numbers.

What is claimed is:

1. A facsimile apparatus including;
   a card mounting portion for detachably receiving a data memorandum card having data input keys and light-emitting means for transmitting data, said card mounting portion being formed as a recess to receive the data memorandum card therein and having an opening portion for the card received in the recess to be operated therethrough;
   a slide member for receiving the card, the slide member being, disposed in said card mounting portion and having a light transmitting portion which opposes said light emitting means when the card is received in the slide member;
   light-receiving means for receiving a light signal from said light-emitting means and through the light transmitting portion, said light-receiving means being arranged in said card mounting portion;
   biasing means for biasing the slide member in one direction, the biasing means varying the biased position of the slide member depending on whether the card is received or not, whereby when the card is received the slide member is biased to a position where the light transmitting portion opposes said light-receiving means, and when the card is not received the light transmitting portion is biased to a position where the light transmitting portion does not oppose said light receiving means; and
   light-shielding means for shielding said light-receiving means, said light-shielding means taking a light-shielding state when the card is not received.

2. A facsimile apparatus including:
   a card mounting portion for detachably receiving a data memorandum card having data input keys and light-emitting means for transmitting data, said card mounting portion being formed as a recess to receive the data memorandum card therein and having an opening portion for the card received in the recess to be operated therethrough;
   said card mounting portion includes a light transmitting portion arranged to oppose said light emitting means when the card is received in the card mounting portion;
   a slide member disposed movably in said card mounting portion said slide member including light-receiving means for receiving a light signal from said light-emitting means through the light transmitting portion;
   biasing means for biasing the slide member in one direction, the biasing means varying the biased position of the slide member depending on whether the card is received or not, whereby when the card is received the slide member is biased to a position where the light transmitting portion of the card mounting portion opposes said light-receiving means of the slide member, and when the card is not received the slide member is biased to a position where the light transmitting portion of the card mounting portion does not oppose said light receiving means of the slide member; and light shielding means for shielding said light-receiving means of the slide member, said light shielding means taking a light shielding state when the card is not received.

* * * * *

UNITED STATES PATENT AND TRADEMARK OFFICE
CERTIFICATE OF CORRECTION

PATENT NO. : 5,392,134

DATED : February 21, 1995

INVENTOR : YUJI NAKANO, ET AL.

It is certified that errors appear in the above-identified patent and that said Letters Patent is hereby corrected as shown below:

Title page, item
[57] Abstract

Line 4, "allow" should read --allowing--.

COLUMN 2

Line 39, "view" should read --view showing--.

COLUMN 5

Line 1, ".image" should read --image--; and

Line 60, "N·to" should read --$N_1$ to--.

COLUMN 6

Line 21, "to the" should be deleted.

COLUMN 7

Line 28, "mousing" should read --mounting--;

Line 34, "form" should read --from--; and

Line 60, "10" should be deleted.

COLUMN 10

Line 6, "$N_t$ to $N_7$" should read --$N_1$ to $N_7$--;

Line 35, "$L_t$ to $L_7$" should read --$L_1$ to $L_7$--; and

Line 60, "$N_t$" should read --$N_1$--.

UNITED STATES PATENT AND TRADEMARK OFFICE
CERTIFICATE OF CORRECTION

PATENT NO. : 5,392,134

DATED : February 21, 1995

INVENTOR : YUJI NAKANO, ET AL.

It is certified that errors appear in the above-identified patent and that said Letters Patent is hereby corrected as shown below:

COLUMN 11

Line 57, "$30_t$," should read --$30_1$--; and

Line 58, "$N_t$" should read --$N_1$--.

COLUMN 12

Line 24, "portion $7_b$" should read --portion 7b--; and

Line 67, "interferes" should read --interferes with--.

COLUMN 14

Line 15, "including;" should read --including:--;

Line 24, "being," should read --being--; and

Line 58, "portion" should read --portion,--.

UNITED STATES PATENT AND TRADEMARK OFFICE
CERTIFICATE OF CORRECTION

PATENT NO. : 5,392,134

DATED : February 21, 1995

INVENTOR : YUJI NAKANO, ET AL.

It is certified that errors appear in the above-identified patent and that said Letters Patent is hereby corrected as shown below:

<u>DRAWING, Sheet 7</u>

Figure 13:
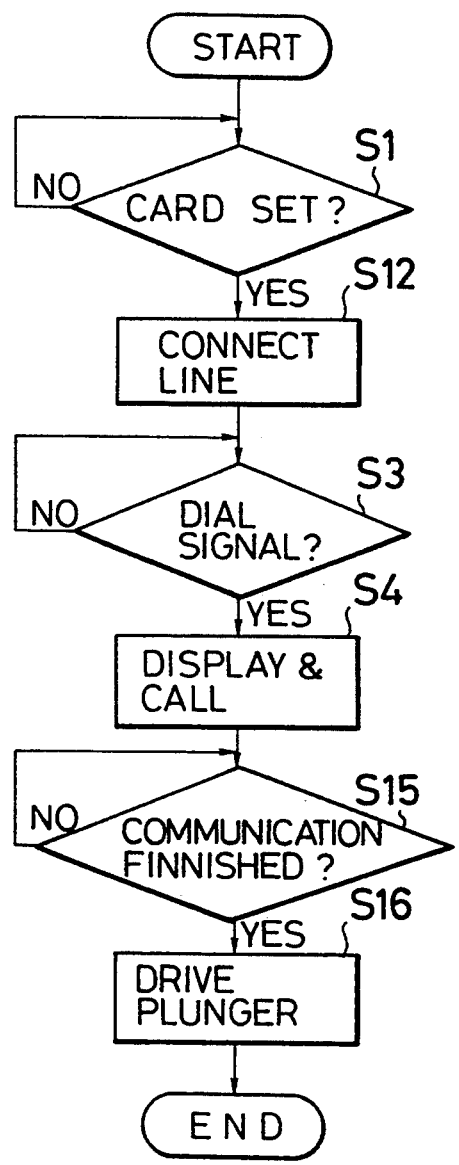
FIG. 13 is a flow chart showing an operation of the apparatus having the mounting portion shown in FIG. 12.

FIG. 13, "FINNISHED" should read --FINISHED--.

Signed and Sealed this

Twenty-second Day of August, 1995

Attest:

BRUCE LEHMAN

*Attesting Officer*      *Commissioner of Patents and Trademarks*